US010110548B2

(12) United States Patent
Clarke et al.

(10) Patent No.: US 10,110,548 B2
(45) Date of Patent: Oct. 23, 2018

(54) DELIVERY AND MANAGEMENT OF STATUS NOTIFICATIONS FOR MULTIPLE MESSAGE FORMATS

(75) Inventors: Michael Frederick Harness Clarke, Waterloo (CA); Sanjay Kalyanasundaram, Millbrae, CA (US); Calvin Roex, North Vancouver (CA)

(73) Assignee: BlackBerry Limited, Waterloo (CA)

( * ) Notice: Subject to any disclaimer, the term of this patent is extended or adjusted under 35 U.S.C. 154(b) by 333 days.

(21) Appl. No.: 13/344,919

(22) Filed: Jan. 6, 2012

(65) Prior Publication Data

US 2012/0179767 A1    Jul. 12, 2012

Related U.S. Application Data

(60) Provisional application No. 61/430,455, filed on Jan. 6, 2011.

(51) Int. Cl.
*G06F 15/16* (2006.01)
*H04L 12/58* (2006.01)
*H04L 12/18* (2006.01)

(52) U.S. Cl.
CPC .......... *H04L 51/34* (2013.01); *H04L 12/1863* (2013.01); *H04L 12/1868* (2013.01); *H04L 51/30* (2013.01)

(58) Field of Classification Search
CPC ............. H04L 12/5885; H04L 12/5875; H04L 12/1863; H04L 12/1868; H04L 51/30; H04L 51/34

(Continued)

(56) References Cited

U.S. PATENT DOCUMENTS 6,032,051 A    2/2000  Hall et al.
6,085,068 A    7/2000  Eaton et al.
(Continued)

FOREIGN PATENT DOCUMENTS

EP    1309211 A2    5/2003
EP    1473917 A1    11/2004
EP    2227044 A1    9/2010

OTHER PUBLICATIONS

International Search Report and Written Opinion dated Apr. 17, 2012 from PCT/CA2012/050006.

(Continued)

*Primary Examiner* — Liangche A Wang
*Assistant Examiner* — Johnny Aguiar
(74) *Attorney, Agent, or Firm* — Jenna L. Wilson; Wilson Lue LLP

(57) ABSTRACT

Systems and methods are provided for managing and delivering status notifications relating to messages transmitted between communication devices. Each communication device is provided with a status agent for detecting transmission of messages to a recipient device and receipt of messages from a sending device. Upon transmission, the status agent notifies a status service of the outbound message. Upon receipt of a message or upon the message being marked read once received, the status agent notifies the status service that the received message has been received or read accordingly. The status service then notifies the status agent of the sending device that the message has been received or read, so that the sending device's status agent can notify a corresponding messaging application. The status service operates to reconcile outbound message notification and received or read status updates for messages sent using a number of different applications or formats.

16 Claims, 13 Drawing Sheets

(58) Field of Classification Search
USPC .......... 709/206, 207, 224; 455/412.1, 412.2
See application file for complete search history.

(56) References Cited

U.S. PATENT DOCUMENTS

| | | | |
|---|---|---|---|
| 6,208,870 B1 | 3/2001 | Lorello et al. | |
| 6,618,749 B1 | 9/2003 | Saito et al. | |
| 6,782,414 B1 | 8/2004 | Xue et al. | |
| 6,854,007 B1 | 2/2005 | Hammond | |
| 6,944,271 B2 | 9/2005 | Yakura et al. | |
| 6,954,136 B2 | 10/2005 | Sauer | |
| 7,043,530 B2 | 5/2006 | Isaacs et al. | |
| 7,236,472 B2 | 6/2007 | Lazaridis et al. | |
| 7,315,747 B2 | 1/2008 | Klassen et al. | |
| 7,317,697 B2 | 1/2008 | Lewis et al. | |
| 7,672,663 B2 | 3/2010 | Klassen et al. | |
| 7,818,373 B2 | 10/2010 | Best et al. | |
| 7,849,213 B1 | 12/2010 | Borghetti | |
| 8,307,074 B1* | 11/2012 | Martin | H04L 12/6418 709/206 |
| 2001/0005859 A1 | 6/2001 | Okuyama et al. | |
| 2002/0104026 A1* | 8/2002 | Barra et al. | 713/202 |
| 2005/0021650 A1 | 1/2005 | Gusler et al. | |
| 2005/0220064 A1 | 10/2005 | Hundscheidt et al. | |
| 2005/0265525 A1 | 12/2005 | Tang et al. | |
| 2006/0025113 A1* | 2/2006 | Nguyen et al. | 455/412.1 |
| 2006/0168023 A1* | 7/2006 | Srinivasan | H04L 12/5855 709/206 |
| 2006/0187897 A1 | 8/2006 | Dabbs, III et al. | |
| 2007/0073816 A1* | 3/2007 | Kumar | G06Q 10/107 709/206 |
| 2007/0106737 A1 | 5/2007 | Barnes et al. | |
| 2007/0143417 A1* | 6/2007 | Daigle | 709/206 |
| 2008/0028027 A1 | 1/2008 | Jachner | |
| 2008/0037722 A1 | 2/2008 | Klassen | |
| 2008/0162645 A1* | 7/2008 | Kraft et al. | 709/206 |
| 2008/0162649 A1 | 7/2008 | Lee et al. | |
| 2008/0219416 A1* | 9/2008 | Roujinsky | 379/88.13 |
| 2009/0049141 A1* | 2/2009 | Jones | G06Q 10/107 709/206 |
| 2009/0157816 A1* | 6/2009 | Pattan | 709/206 |
| 2009/0172399 A1* | 7/2009 | Schmid | 713/168 |
| 2009/0187631 A1 | 7/2009 | Su et al. | |
| 2009/0197622 A1 | 8/2009 | Atarius | |
| 2010/0042690 A1 | 2/2010 | Wall | |
| 2010/0095308 A1* | 4/2010 | Blue | G06F 9/546 719/314 |
| 2010/0130174 A1 | 5/2010 | Venkob et al. | |
| 2010/0153505 A1* | 6/2010 | Oh | G06Q 10/107 709/206 |
| 2010/0205267 A1 | 8/2010 | Klassen et al. | |
| 2010/0250682 A1* | 9/2010 | Goldberg | G06Q 10/107 709/206 |
| 2010/0304766 A1* | 12/2010 | Goyal | 455/466 |
| 2011/0047483 A1* | 2/2011 | Low et al. | 715/752 |
| 2011/0060800 A1* | 3/2011 | Cohen et al. | 709/206 |
| 2011/0072077 A1* | 3/2011 | Tomkow | 709/203 |
| 2011/0238861 A1* | 9/2011 | Hutchinson | 709/238 |

OTHER PUBLICATIONS

RFC 5438 Burger, E. and Khartabil, H. "Instant Message Disposition Notification (IMDN)", pp. 1-38, Feb. 2009.
"SpyPig Requirements & Limitations", retrieved Dec. 19, 2010 from http://www.spypig.com/requirements.php, pp. 1-3.
Fisher Young Group, "MSGTAG Support", retrieved Dec. 19, 2010 from http://www.msgtag.com/support/status/, pp. 1-10.
ReadNotify, "ReadNotify.com FAQ", retrieved Dec. 17, 2010 from http://www.readnotify.com/readnotify/text/faq.asp, pp. 1-6.
Extended European Search Report dated Feb. 15, 2012 from EP12150394.0, 7 pgs.
Examination Report dated Apr. 16, 2014 from EP 12150394.0, 4 pgs.
Examination Report dated Nov. 4, 2015 from EP 12150394.0, 5 pgs.
Summons to attend oral proceedings dated Jun. 2, 2017 from EP 12150394.0, 6 pgs.
Office Action dated Feb. 28, 2018 received in Canadian Patent Application No. 2,823,817, 4 pgs.

* cited by examiner

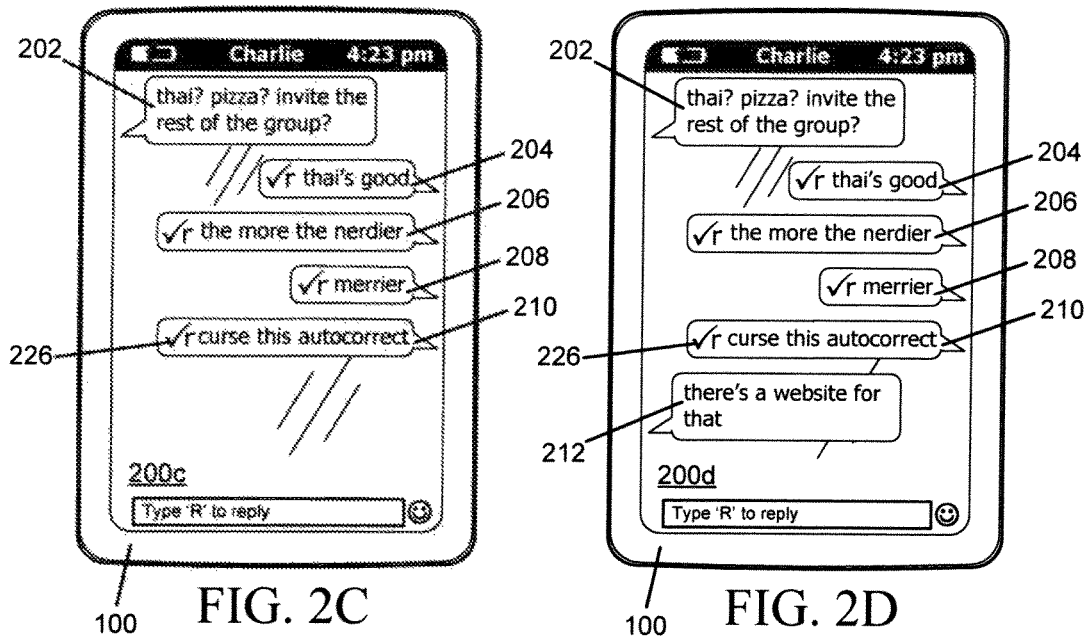
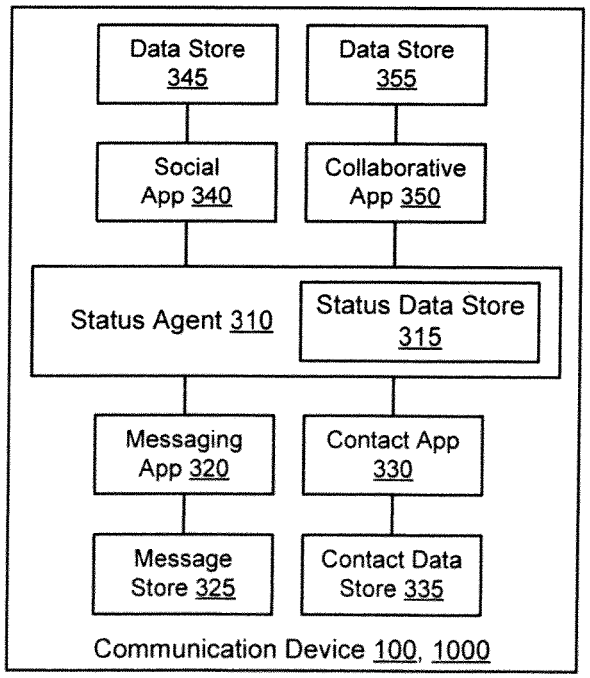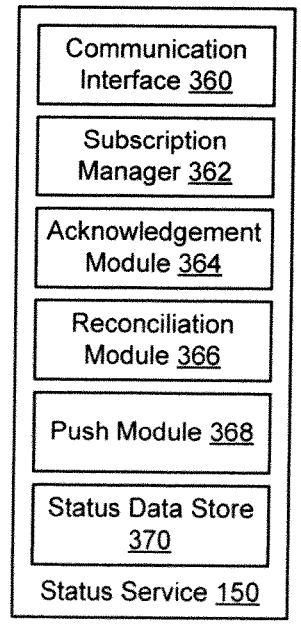
FIG. 3A  FIG. 3B

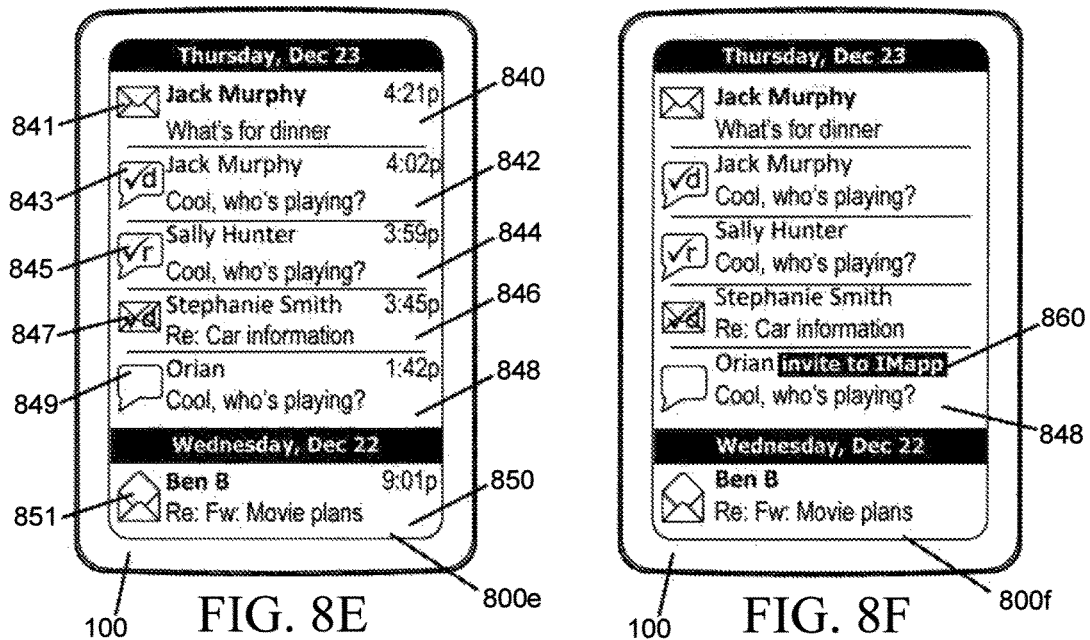
FIG. 8E
FIG. 8F
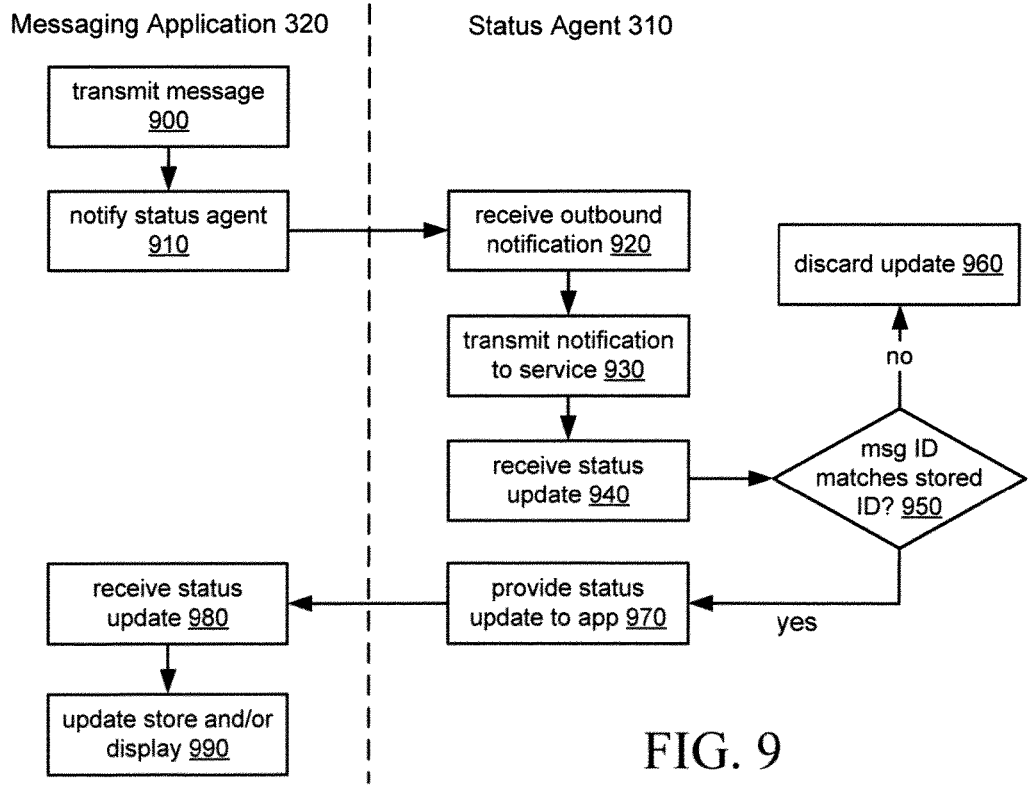
FIG. 9

DELIVERY AND MANAGEMENT OF STATUS NOTIFICATIONS FOR MULTIPLE MESSAGE FORMATS

CROSS-REFERENCE TO RELATED APPLICATIONS

This application claims priority to U.S. Provisional Application No. 61/430,455, filed 6 Jan. 2011, the entirety of which is incorporated herein by reference.

Background

1. Technical Field

The present disclosure relates generally to management and delivery of electronic message status information.

2. Description of the Related Art

Messages can be transmitted, received or stored in a variety of electronic formats, including without limitation email, instant or private messages (both network-based and peer-to-peer), SMS (Short Message Service), MMS (Multimedia Messaging Service), VVM (Visual Voicemail), voicemail, and the like. Messages may be transmitted using store-and-forward or real-time systems. Several of these message formats, whether by virtue of message size or transmission protocol, can be quickly delivered to recipients and thus used to provide reasonably timely information and responses, even if relayed using a store-and-forward system. Since participants in electronic communications typically communicate with other participants in remote locations, the immediacy and context of an in-person conversation, such as the implicit knowledge that the other participant in the conversation has heard or received the speaker's communication, may be lost.

BRIEF DESCRIPTION OF THE DRAWINGS

In drawings which illustrate by way of example only embodiments of the present disclosure.

FIGS. 2A to 2D are illustrations of graphical user interfaces presented on a communication device screen for a chat or instant messaging application.

FIG. 3A is a schematic diagram of select components of a communication device for use with the network of FIG. 1.

FIG. 3B is a schematic diagram of a status service for use with the network of FIG. 1.

FIGS. 8E and 8F are illustrations of graphical user interfaces presented on a communication device screen for a unified message box.

FIG. 9 is a flowchart illustrating a process for transmission and receipt of a message and related status information implemented at a communication device.

DETAILED DESCRIPTION

Figure 1:
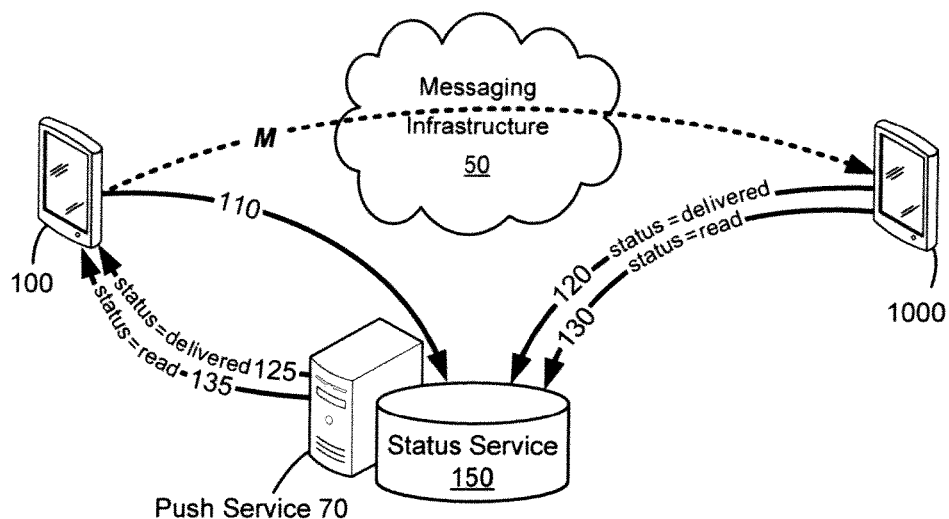
FIG. 1 is a schematic diagram illustrating a network topology for use in communicating status information between mobile communication devices.

The embodiments described herein provide a computing or communication device, service and method providing enhancements to existing messaging infrastructures and systems to improve user experience in electronic messaging by enhancing the apparent immediacy of electronic communication, and by augmenting the contextual information available to the participants in the electronic communication, for a variety of message formats. These embodiments will be described and illustrated primarily in relation to communication devices, such as wireless communication devices, communicating over wireless networks and public networks. It will be appreciated by those skilled in the art, however, that this description is not intended to limit the scope of the described embodiments to implementation on these particular systems or to wireless devices. For example, the methods and systems described herein may be applied to any appropriate communication device or data processing device adapted to communicate with another communication or data processing device over a fixed or wireless connection, whether portable or wirelessly enabled or not, whether provided with voice communication capabilities or not, and additionally or alternatively adapted to process data and carry out operations on data in response to user commands for any number of purposes, including productivity and entertainment. Thus, the embodiments described herein may be implemented on computing devices adapted for communication or messaging, including without limitation cellular phones, smartphones, wireless organizers, personal digital assistants, desktop computers, terminals, laptops, tablets, handheld wireless communication devices, notebook computers, entertainment devices such as MP3 or video players, and the like. Unless expressly stated, a computing or communication device may include any such device.

Thus, the embodiments herein provide a method, comprising: transmitting a plurality of messages from a communication device for delivery to a corresponding recipient, each of the plurality of messages being associated with a different one of a plurality of messaging applications executing at the communication device; detecting, by a status agent executing at the communication device and in communication with the plurality of messaging applications, transmission of each of said plurality of messages; transmitting, by the status agent for receipt by a status service, an outbound message notification for each of said plurality of messages thus transmitted; receiving, by the status agent from the status service, a status update message for each of said plurality of messages, each said status update message indicating delivery of said message to a corresponding receiving communication device; and notifying, by the status agent, each of said plurality of messaging applications of delivery of its associated one of the plurality of messages.

In one aspect, the method further provides for receiving, by the status agent from the status service, a status update message for each of said plurality of messages indicating that each of said plurality of messages was read at the corresponding receiving communication device; and notifying, by the status agent, each of said plurality of messaging applications that its associated one of the plurality of messages has been read.

In another aspect, the method further comprises each of said plurality of messaging applications: upon being notified of delivery of its associated one of the plurality of messages, displaying an indicator indicating that said associated one of the plurality of messages was delivered; and upon being notified that its associated one of the plurality of messages has been read, displaying an indicator indicating that said associated one of the plurality of messages was read.

In yet another aspect, the status agent detecting transmission of each of said plurality of messages comprises the status agent receiving, from each of said plurality of messaging applications, a notification for its associated one of the plurality of messages.

In still another aspect, the status agent detecting transmission of each of said plurality of messages comprises the status agent monitoring an outbound message queue for each of said plurality of messaging applications.

The embodiments herein also provide a method, comprising: receiving a plurality of messages at a communication device, each of the plurality of messages being associated with a different one of a plurality of messaging applications executing at the communication device; detecting, by a status agent executing at the communication device and in communication with the plurality of messaging applications, receipt of each of said plurality of messages; transmitting, by the status agent for receipt by a status service, a received message notification for each of said plurality of messages thus received; detecting, by the status agent, that each of said plurality of messages has been read; and transmitting, by the status agent for receipt by the status service, a read message notification for each of said plurality of messages thus read.

In one aspect of this method, the method further provides for: transmitting a further plurality of messages from the communication device for delivery to one or more recipients, each of the further plurality of messages being associated with a different one of the plurality of messaging applications; detecting, by the status agent, transmission of each of said plurality of messages; transmitting, by the status agent for receipt by the status service, an outbound message notification for each of said further plurality of messages thus transmitted; receiving, by the status agent from the status service, a status update message for each of said further plurality of messages, each said status update message indicating delivery of said message to a corresponding receiving communication device; and notifying, by the status agent, each of said plurality of messaging applications of delivery of its associated one of the further plurality of messages.

In another aspect, the method further comprises: receiving, by the status agent from the status service, a status update message for each of said further plurality of messages indicating that each of said further plurality of messages was read at the corresponding receiving communication device; and notifying, by the status agent, each of said plurality of messaging applications that its associated one of the plurality of messages has been read.

In yet another aspect, the status agent detecting receipt of each of said plurality of messages comprises the status agent receiving, from each of said plurality of messaging applications, a notification for its associated one of the plurality of messages.

In still another aspect, the status agent detecting receipt of each of said plurality of messages comprises the status agent monitoring an inbound message queue for each of said plurality of messaging applications.

In still another aspect, the status service comprises one or more servers in communication with the communication device at least in part over a wireless network.

In yet another aspect, each of said plurality of messages or further plurality of messages is transmitted for delivery to the one or more recipients via a messaging infrastructure and the status service is separate from the messaging infrastructure.

Still further, the communication device may be a wireless communication device.

The embodiments herein also provide a communication system, comprising: means adapted to store messages; means adapted to execute one or more messaging applications; means adapted to enable transmission of one or more messages for delivery to a corresponding recipient and to enable receipt of one or more messages, each of the one or more transmitted or received messages being associated with a different one of the one or more messaging applications; and status agent means in communication with the one or more messaging applications, the status agent means comprising: means adapted to detect transmission or receipt of messages; means adapted to detect when any of the one or more received messages has been read at the communication system; means adapted to enable transmission of, for receipt by a status service, an outbound message notification for each of said one or more transmitted messages once detected, a received message notification for each of said one or more received messages once detected, and a read message notification for each of said one or more received messages once detected as being read; means adapted to enable receipt from the status service of a delivery status update message for each of said one or more transmitted messages indicating delivery of said transmitted message to a corresponding receiving communication system, and a read status update message for each of said one or more transmitted messages indicating that each of said one or more transmitted messages was read at the corresponding receiving communication system; means adapted to notify each of the one or more messaging applications that its associated one of the one or more transmitted messages has been delivered once a delivery status update message has been received; and means adapted to notify each of the one or more messaging applications that its associated one of the one or more transmitted messages has been read once a read status update message has been received.

There is further provided a communication system, comprising: at least one data store for storing messages; and one or more processors in communication with said at least one data store, the one or more processors being configured to: enable transmission of one or more messages for delivery to a corresponding recipient and receipt of one or more messages, each of the one or more transmitted or received messages being associated with a different one of one or more messaging applications executing at the communication system; detect, by a status agent executing at the communication system and in communication with the one or more messaging applications, said transmission or receipt; detect, by the status agent, when any of the one or more received messages has been read at the communication system; enable transmission of, by the status agent for receipt by a status service, an outbound message notification for each of said one or more transmitted messages once detected, a received message notification for each of said one or more received messages once detected, and a read message notification for each of said one or more received messages once detected as being read; enable receipt of, by the status agent from the status service, a delivery status update message for each of said one or more transmitted messages indicating delivery of said transmitted message to a corresponding receiving communication system, and a read status update message for each of said one or more transmitted messages indicating that each of said one or more transmitted messages was read at the corresponding receiving communication system; notify, by the status agent, each of the one or more messaging applications that its associated one of the one or more transmitted messages has been delivered once a delivery status update message has been received; and notify, by the status agent, each of the one or more messaging applications that its associated one of the one or more transmitted messages has been read once a read status update message has been received.

In one aspect, the communication system further comprises wireless communication means or a communication subsystem for wireless communication, wherein transmission of said one or more transmitted messages, outbound message notifications, received message notifications, and read message notifications, and receipt of said one or more received messages, delivery status update messages, and read status update messages is carried out using said wireless communication means or communication subsystem.

The communication system may be comprised in a wireless communication device or in one or more servers or other computing devices. Further, the communication system may communicate with said status service over a wide area network. The one or more messaging applications may comprise a plurality of messaging applications, and include at least one instant messaging application.

There is also provided a status service system for managing status notifications for multiple messaging applications, the status service system comprising: means adapted to receive over a network outbound message notifications from a plurality of sending communication devices, each of said outbound message notifications corresponding to one of a plurality of messages sent from one of said plurality of sending communication devices, each of the plurality of messages being associated with a different one of a plurality of messaging applications; receiving means adapted to receive over the network a delivery status update message from one of a plurality of receiving communication devices for each of the plurality of messages and a read status update message from said one of the plurality of receiving communication devices for each of the plurality of messages; reconciliation means adapted to reconcile each of said delivery status update messages and each of said read status update messages with one of said outbound message notifications to determine a corresponding one of the sending communication devices; and sending means adapted to provide over the network a received message notification to the corresponding one of the sending communication devices in response to receiving said delivery status update message, and a read message notification to the corresponding one of the sending communication devices in response to receiving said read status update message.

In one aspect, there is also provided registration means adapted to register each one of the plurality of sending communication devices and each one of the plurality of receiving communication devices with the status service system.

There is also provided a status service system for managing status notifications for multiple messaging applications, the status service system comprising: at least one data store configured to store outbound message notification data; a communication subsystem configured to communicate over a network; and one or more processors in communication with the at least one data store and the communication subsystem, the one or more processors being configured to: receive, using the communication subsystem, outbound message notifications from a plurality of sending communication devices, each of said outbound message notifications corresponding to one of a plurality of messages sent from one of said plurality of sending communication devices, each of the plurality of messages being associated with a different one of a plurality of messaging applications; receive, using the communication subsystem, a delivery status update message from one of a plurality of receiving communication devices for each of the plurality of messages and a read status update message from said one of the plurality of receiving communication devices for each of the plurality of messages; reconcile each of said delivery status update messages and each of said read status update messages with one of said outbound message notifications to determine a corresponding one of the sending communication devices; and send, using the communication subsystem, a received message notification to the corresponding one of the sending communication devices in response to receiving said delivery status update message, and a read message notification to the corresponding one of the sending communication devices in response to receiving said read status update message. The at least one processor can be further configured to register each one of the plurality of sending communication devices and each one of the plurality of receiving communication devices with the status service system.

There is also provided a system for transmission and receipt of messages, the system comprising a plurality of sending communication devices, each of said sending communication devices comprising aforementioned communication system a plurality of receiving communication devices, each of said receiving communication devices comprising the aforementioned communication system, each of the plurality of receiving communication devices being configured to receive messages from at least one of the plurality of sending communication devices via a messaging infrastructure; and the aforementioned status service system, the status service system being configured to communicate with each one of the plurality of sending communication devices and each one of the plurality of receiving communication devices. In one aspect, the status service system is separate from the messaging infrastructure.

Further, there is provided a method of managing status notifications for multiple messaging applications, the method comprising: receiving over a network outbound message notifications from a plurality of sending communication devices, each of said outbound message notifications corresponding to one of a plurality of messages sent from one of said plurality of sending communication devices, each of the plurality of messages being associated with a different one of a plurality of messaging applications; receiving over the network a delivery status update message from one of a plurality of receiving communication devices for each of the plurality of messages and a read status update message from said one of the plurality of receiving communication devices for each of the plurality of messages; reconciling each of said delivery status update messages and each of said read status update messages with one of said outbound message notifications to determine a corresponding one of the sending communication devices; and providing over the network a received message notification to the corresponding one of the sending communication devices in response to receiving said delivery status update message, and a read message notification to the corresponding one of the sending communication devices in response to receiving said read status update message. Each of the plurality of sending communication devices and plurality of receiving communication devices may be first registered with the status service system.

An aspect of the methods and systems described herein is that the plurality of messaging applications comprises at least one instant messaging application. In a further aspect, the plurality of messaging applications comprises a plurality of instant messaging applications. Still further, the plurality of messaging applications comprises either an email application or an SMS application. The plurality of messages can comprise a plurality of message formats, including instant messages.

The embodiments herein will be described and illustrated primarily in relation to instant messages and email. However, it will also be appreciated by those skilled in the art that these embodiments extend to other types and formats of messages, including without limitation private messages, SMS (Short Message Service), MMS (Multimedia Messaging Service), VVM (Visual Voicemail), voicemail, and the like. The formatting and transmission of all such messages, and the implementation of suitable messaging infrastructures to support such communications, will be known to those skilled in the art.

For example, email messages and services may be constructed and implemented in accordance with known Internet messaging standards including Internet Message Format RFC 5322 and RFC 2822, published by the Internet Engineering Task Force, as well as their predecessor, successor, and companion standards. Instant messages include network-based and peer-to-peer messages, and such messages and services may be defined in accordance with known standards such as RFC 2779 and RFC 3921 also published by the Internet Engineering Task Force, and their companion, predecessor and successor standards. Point-to-point SMS messages may be implemented in accordance with 3GPP ($3^{rd}$ Generation Partnership Product) Technical Specification 03.40, and optionally extended for transmission of MMS messages as specified by the Open Mobile Alliance Multimedia Messaging Service V1.3, and their companion, predecessor and successor standards. All such messages and services intended for use with the within embodiments may also be defined in accordance with proprietary standards and protocols. Messages may be defined, formatted, and presented using messaging applications implemented on user devices such as the communication devices described above.

Such messages are also identifiable by a unique or quasi-unique handle or identifier (ID), implemented within the message format in a suitable location, for example in the header of the message. Messages may be interrelated, for example associated by cross-referencing identifiers, thread identifiers, subject line, or the like. Whether interrelated or not, messages exchanged between a given set of participants (senders and recipients, or originating and recipient or destination devices) may be presented by messaging applications in a conversational paradigm, chronological order, or reverse chronological order, or in any other suitable presentation form or order.

The messages contemplated herein also include other user-generated or computer-generated entities transmitted to a recipient communication device via other types of communication applications or services, such as social applications, data and news feeds, content aggregators, and other utilities. Such entities can include messages or other content transmitted from a sender to a recipient for receipt at his or her communication device in a collaborative or groupware environment. For ease of reference, the embodiments herein are described primarily with reference to messages such as email and instant messages, but are not intended to be exclusive of other message types.

The various forms of electronic messages mentioned above generally lack the immediacy and context of an in-person conversation, given that the sender and recipient of a message are usually, although not always, physically separated from each other. Because of the separation, the sender cannot know, without further express information from the recipient, whether the recipient has received the message. The recipient cannot know without express feedback from the sender that the sender is aware that the recipient has received the message. Similarly, even if the sender knows the message was received, he or she cannot know without express information from the recipient whether the recipient has read, viewed, heard, or otherwise consumed the message. Confirmation that the recipient has read or received a message may be inferred if the recipient actually responds to the message or its contents in a subsequent message, but there may be a delay between the time the recipient reads a message and responds to it. If the information contained in the message is time-sensitive (for example, if it pertains to an upcoming meeting and the recipient's acknowledgement is required), waiting for the recipient to reply to confirm that the message has been read may be particularly inconvenient. Further, waiting for the recipient's reply may pre-empt the sender from taking some other action in a timely manner, such as conveying the necessary information to the recipient by an alternate means, or inviting another person to the upcoming meeting in view of the recipient's non-reply).

Requiring an express response from the recipient confirming that the message was received or read places additional burden on the messaging infrastructure used to deliver the messages between the sender and recipient, since for each message sent, the messaging infrastructure must transmit at least one further message relating to the delivery or reading of the message for receipt by the sender's client messaging application. Such delivery notifications and read receipts thus impose a greater burden on the sender's client messaging application and the sender's communication device, which must receive and process the further message. Conventional message delivery notifications and read receipts in email, for example, are delivered by email to the sender's client email application. Such conventional notifications therefore must be processed by the sender's client email application, either by displaying the received notification or receipt to the user or by correlating the received notification or receipt to a sent message in the user's sent email store.

Further, conventional message delivery notifications and read receipts, given that they are formatted and transmitted using the same transport as the original message, are potentially subject to the same delivery delays and constraints as the original message. This potentially impacts the timeliness with which notifications and receipts are delivered to the sender and detracts from the communication experience with the recipient; without knowledge that the recipient has read an initial message, the sender may be led to compose a follow-up message that would have been deemed unnecessary had the sender known the recipient had read the initial message.

In addition, conventional email message delivery notifications and read receipts often must be requested by the sender (through flags or values set in the outbound message header), and those requests are just as often ignored by the recipient's client messaging application, which may not be configured to process the header flag, or by the recipient, who may expressly instruct his or her client messaging application not to transmit a read receipt message.

Accordingly, a system such as that illustrated in the accompanying drawings may be implemented to provide a parallel mechanism for providing message delivery and read status updates to client messaging applications. FIG. 1 illustrates a simplified network topology for communicating between two mobile communication devices 100, 1000. It will be appreciated by those skilled in the art that a number of components, such as wireless networks and gateways and the like, are omitted simply for clarity of presentation in the accompanying figures. In FIG. 1, a message M is transmitted from the sender at the originating communication device 100 to the recipient at the destination or receiving communication device 1000 using a messaging service, not illustrated. The message M is shown as being delivered via a messaging infrastructure 50 supporting the messaging service. The messaging infrastructure may be any suitable infrastructure known in the art for transporting any of the above-mentioned message formats and can include both software and hardware components. The messaging infrastructure 50, for example, may be implemented using public data networks and/or public switched telephone networks. The network components used to facilitate communications between the communication devices 100, 1000 and between the devices 100, 1000, push service 70 and the status service 150 described below may be integrated with components of or supporting the messaging infrastructure 50, or alternatively may be separate from the messaging infrastructure 50.

When the message M is transmitted from the originating device 100, a notification 110 indicating that the message M was transmitted from the originating device 100 is also transmitted from the originating device 100 to the status service 150. The status service 150 is typically located remotely from the communication devices 100, 1000 and may be accessible over a public wide-area network such as the Internet. The status service 150 receives and stores the notification.

After receipt of the message M at the receiving device 1000, at least one status notification is transmitted from the receiving device 1000 to the status service 150. A first status notification 120 can indicate that the message was received by the receiving device 1000 (i.e., "delivered" to the receiving device 1000). A second status notification 130 can indicate that the message was read at the receiving device 1000, that is to say, it was displayed or otherwise rendered and presented for user consumption (for example, rendered as an audio file or by a text-to-speech module operating at or in cooperation with the receiving device 1000).

It will be appreciated by those skilled in the art that by referring to a message as "read", it is meant that the message was either accessed or rendered such that it was presented in a manner enabling a user to peruse or review at least a portion of the message content not displayable or otherwise perceivable in a simple message listing, inbox listing, or message preview window or display. Thus, a "read" message is not restricted to actual user consumption or comprehension of the message; a message may be appropriately considered to be "read" when the message is opened in a messaging application, even if a user did not look at or listen to the message. Further, a message received at a communication device may be marked "read" in response to an express instruction received at the device, even if it was not rendered as described above. A message that is "unread" is one that has not been "read" or marked "read". A synonym for "read" in this context, as would be well understood by the person skilled in the art, is "opened", and a synonym for "unread" is "unopened". In some embodiments, the display of a message in whole or in part in a message preview view may not constitute the message being "read", but only "delivered", depending on system configuration.

Each of these notifications 120, 130 may be delivered consecutively to the status service 150, or as part of the same notification message if detection that the message was read occurred prior to transmission of the first status notification 120. Upon receipt of one or more of the status notifications 120, 130, the status service 150 transmits a corresponding status update 125, 135 to the originating device 100. Upon receipt of the first status notification 120, for example, the status service 150 transmits a status update 125 indicating that the message M was delivered. Upon receipt of the second status notification 130, the status service 150 transmits a status update 135 indicating that the message M was read. Thus, the originating device 100 receives updated information concerning the status of the message M.

In these embodiments, the status updates transmitted from the status service 150 to the originating device 100 are advantageously transmitted via a push service 70. The push service 70 provides the status updates 125, 135 effectively in real time. When the status service 150 receives a status notification 120, 130 from the receiving device 1000, the status service 150 transmits a push request (not shown) comprising a status update to be transmitted to the originating device 100 to the push service 70. The push service 70 acknowledges the request and transmits the data to the originating device 100. The originating device 10 can then transmit a response to the push service 70 acknowledging the pushed data. Confirmation that the status update was received by the originating device 100 may then be provided by the push service 70 to the status service 150. While the push service 70 is omitted in the following figures portraying network configurations and data flow, it will be appreciated that a similar service can be implemented to deliver content to the various communication devices in all of the embodiments described herein. Further, in some embodiments the push service 70 or a similar service can also be used to transmit messages to the communication devices 100, 1000 although not explicitly illustrated herein.

The various status updates 125, 135 received at the originating device 100 may be used in a client messaging application to denote whether a message transmitted from the device has been received or read by the recipient.

Figures 2A, 2B:
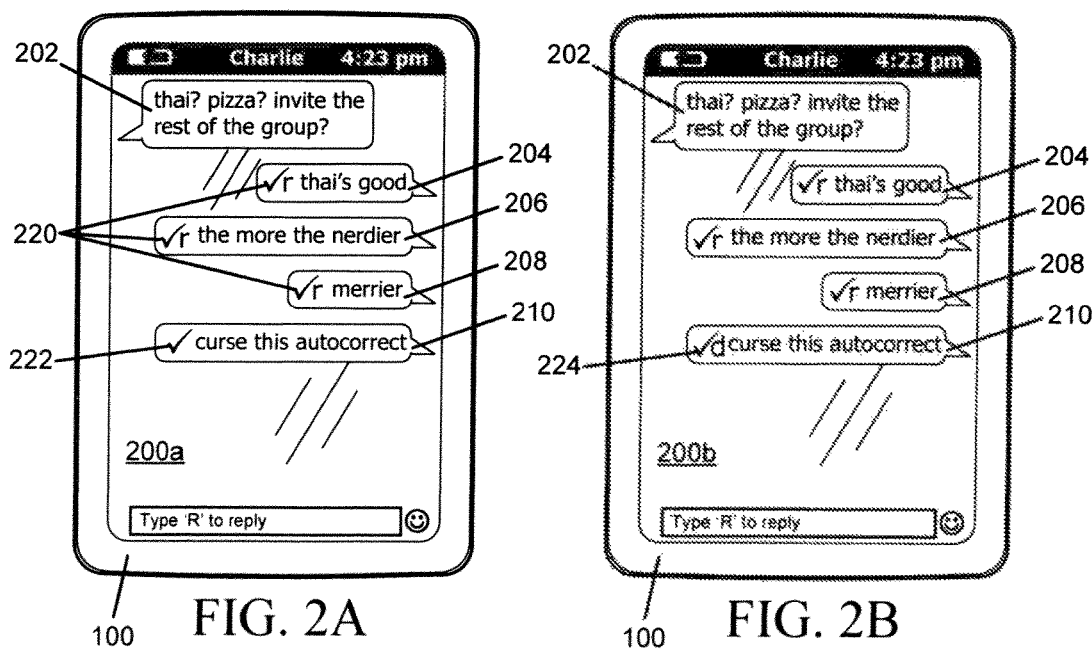

Turning to FIG. 2A, an example graphical user interface for a chat or instant messaging program, displayed in a communication device (in this case, the originating communication device 100), is shown. The interface 200a displays a number of messages 202 . . . 210, here arranged in chronological order illustrating a conversational paradigm. In FIG. 2A, messages transmitted from the originating device 100 are positioned at the right-hand side of the user interface (i.e., messages 204 . . . 210). Each of the messages 204, 206, 208 is displayed with a corresponding "message read" badge or icon 220. Typically, a visual indicator of message status is provided, although other means of indicating the message status may be used, such as audible, vibratory, or tactile indicators. The "message read" icon 220 displayed for these messages indicates that the communication device 100 has received a status update indicating that messages 204, 206, 208 had been read was received from the status service 150, via the push service 70. The originating device 100 may have previously received status updates from the status service 150 indicating that the messages 204, 206, 208 had been delivered, but in this example the user interface is configured to indicate only the most recent status update. The most recently received status for a given message is given precedent over previously received status information.

The final message 210 is shown with an optional "message sent" icon 222, which in this example denotes that the message has been sent from the originating device 100, but no status update has been received indicating that the message was delivered to the destination address or read at the receiving device 1000.

Turning to FIG. 2B, a further graphical user interface 200b for the same application is shown. In this illustration, a further status update for the message 210 was received at the communication device 100 (for example, the status update 125 of FIG. 1), indicating that the message 210 was received at the receiving device 1000. Thus, in the user interface 200b the final message 210 is marked with a "message delivered" icon 224.

FIG. 2C illustrates yet a further graphical user interface 200c. By this point, the status service 150 has transmitted a further status update in respect of the final message 210 (for example, the status update 135 of FIG. 1), indicating that the message has been read at the receiving device 1000. Thus, the icon displayed with the message 210 has been updated to a "message read" icon 226.

As mentioned above, status updates 125, 135 may be received concurrently rather than consecutively. In some embodiments, the device 100 may infer a status for a previously transmitted message in view of subsequent events. For example, the message 210 may still have the status of "sent" or "delivered" as in FIG. 2A or 2B when a further instant message in the conversation 212, shown in FIG. 2D, is received before a status update indicating that the message 210 was read at the receiving device 1000. It can be inferred that composition and transmission of a later message at the receiving device 1000 indicates that the last message received at the receiving device 1000, namely the message 210, had been read. Thus, even if the status service 150 has not yet provided a "read" status update to the originating device 100 in respect of the message 210, upon receipt of the new message 212 the client messaging application at the originating device 100 can effectively override the last received status of the message 210 with an inferred status and display a "message read" icon 226.

To implement the foregoing system of status updates and notifications described in relation to FIG. 1, the communication devices 100, 1000 participating in the exchange of messages are provided with an application or module for providing message status management, here depicted as a status agent 310. As shown in FIG. 3A, which illustrates select components or modules of the communication device 100, 1000, the status agent 310 is provided with a status data store 315, and interfaces with one or more applications executable on the device 100, 1000, such as one or more messaging applications 320, each of which is associated with a corresponding message store 325; one or more contact (address book) applications 330, provided with a corresponding contact data store 335; one or more social applications 340, provided with a corresponding data store 345; and one or more collaborative applications 350, provided with a corresponding data store 355. As understood by those skilled in the art, the various messaging applications 320 may be associated with user accounts provided by one or more messaging services; for example, each user account provisioned on the device 100, 1000 may be associated with a distinct messaging application 320, or multiple user accounts may be associated with the same messaging application 320. The messaging application 320 can also include a unified message box application or function that provides a unified view of message or other content information associated with multiple user accounts or message types, and which serves as an entry point for access to other messaging services or applications executable on the device 100, 1000. The "unified message box" may also be known as a "unified inbox"; however, a unified message box in particular may contain inbound messages, outbound messages, or a combination thereof.

The status agent 310 interoperates with one or more of the foregoing types of applications 320, 330, 340, 350 and functions as an interface or proxy with the status service 150 to provide notification and status management services. Access to the status agent may be provided through an API (application programming interface). For client applications that make use of messaging functions, such as client messaging applications 320, social networking applications 340, and collaborative applications 350, the status agent 310 provides notifications to the status service 150 of outbound messages transmitted from the originating device 100, and receives status update notifications from the status service 150 regarding the status of the outbound messages as received by the recipient device 1000, via the communications module implemented on the device 100 (for example, via a wireless transceiver module, not shown in FIG. 3A).

The status agent 310 also provides updated status information for client applications that consume received status information. For client applications 320, 340, 350, the status agent 310 can provide updated status information corresponding to the outbound messages originated from those client applications. Other client applications that do not originate outbound messages may still consume status information, such as the contacts (address book) application 330. For example, the contacts application may use status update information, which can be associated with a recipient addresses, to indicate the potential availability of contacts corresponding to the recipient addresses. If the most recently received status information for a given recipient address is that the recipient has read an outbound message within a recent period, then the contacts application may indicate that the recipient is "available". If the most recently received status information is only that the outbound message has been delivered, then the contacts application may indicate that the recipient is likely unavailable. Similar availability indications may also be implemented by the other applications 320, 340, 350.

The status agent 310 also detects changes to inbound messages queues at the device 100, 1000, and reports detected changes to the status service 150. When an incoming message for one of the client applications 320, 340, 350 is detected as having been received by the status agent 310, the status agent 310 issues a status update notification to the status service 150 to indicate that the message was received. Similarly, when the status agent 310 detects that the incoming message has been read, the status agent 310 again notifies the status service 150 that the message has now been read.

The status agent 310 may included within the device 100, 1000's operating system, or provided as a separate application. Generally, since the status agent 310 can operate without direct user interaction, it executes as a background process or processes on the device 100, 1000. In the primary examples described herein, the status service 150 provides its status updates to the devices 100, 1000 using a push service 70; accordingly, the status agent 310 on each participating communication device is push-enabled, and configured to listen for push content comprising status updates at a designated port of the device 100, 1000.

Each application 320, 340, 350 that originates outbound messages can invoke the agent 310 to track each outbound message transmitted by the application, for example implementing and providing a callback handler or a defined interface to the agent 310. Alternatively, each application 320, 340, 350 that is configured to originate outbound messages may initially register with the status agent 310 and identify its outbound message queue (not shown) for monitoring by the status agent 310. Additionally, each application 320, 330, 340, 350 that consumes status update information received by the status agent 310 from the service 150 can either receive notifications from the agent 310, or alternatively may monitor an incoming status notification queue (not shown) for incoming status updates relevant to the application 320, 330, 340, 350.

Further, to detect the receipt of incoming messages, the status agent 310 may be configured to monitor the incoming message queues for each application 320, 340, 350 registered with the agent 310, or alternatively the status agent 310 may wait for each application to issue a notification of message receipt. To detect when incoming messages have been read using a given application, the status agent 310 may monitor the application's data store for changes to message status; for example, when a message is read, a messaging application may set a flag associated with the message in the message store to indicate the message has been read. Each application 320, 340, 350 may alternatively maintain a status indicator queue or file comprising recent status updates for received messages that can be monitored by the status agent 310.

FIG. 3B illustrates a possible implementation of the status service 350. The status service 150 is typically implemented on a server system, and includes a status data store 370 for storing message ID information and related status information, as discussed below. A communication interface 360, which may be integrated in the server system, extracts data from the status data store 370 for provision to the push service 70 (not illustrated in FIG. 3B). The push service 70 may be operated by a third party or implemented separately from the status service 150, although the status service 150 may comprise the push service 70 in some examples. The communication interface 360 also receives status notifications from various devices 100, 1000 for storage in the status data store 370. Access to the status service 150 by the agent 310 and by other services, described below, may be provided through a web API or another web service interface supporting REpresentational State Transfer-based communications, although other non-RESTful web service architectures such as service-oriented architectures and remote procedure call web services may be implemented instead. Optionally, the status service 150 is provided with additional components or modules 362 . . . 268, such as a subscription manager 362 for managing the subscription of individual communication devices 100, 1000 and their respective agents 310 to the status service 150, an acknowledgement module for managing acknowledgment messages sent between the status service 150 and the push service 70, a reconciliation module 366 for reconciling received status notifications from receiving devices 1000 with outbound message notifications received from sending devices 100, and a push module 368 for generating, receiving and processing push messages sent to or received from the push service 70.

As a preliminary step before status notifications are transmitted or received, an initial registration of the status agent 310 with the status service 150 may be required. Registration is carried out to provide the status service 150 with a valid address for each device for receiving status update messages. If access to the status service is restricted, then registration may also be required to validate the devices 100, 1000 and their corresponding status agents 310 as valid clients of the status service. This initial registration may take place upon initial provisioning of the device 100, 1000 for wireless communication or for messaging using the messaging infrastructure 50. Alternatively, the registration may take place after initial provisioning, when the user of the device 100, 1000 subscribes to the messaging service supported by the messaging infrastructure 50 or installs a client application 320, 330, 340, 350 that will make use of status notifications, or when the agent 310 is installed or initialized.

The registration may simply comprise the device 100, 1000 transmitting a subscription message to the status service 150 containing a user id or other identifier for the device 100, 1000, and/or the status agent 310; an optional password; and a unique address for receiving push messages. The subscription message is received by the status service 150 and processed by the subscription module to verify the subscription. Subsequently, when the status service 150 generates a status update to be delivered to the registered device 100, 1000, the status service 150 can provide the unique address together with the status update to the push service 70. Additionally, the push service 70, if it is external to the status service 150, may require registration of the status service 150 and the status agent 310. Configuring the push service 70 and registering applications and services with the push service 70 will be known to those skilled in the art.

It will also be appreciated that status updates may be transmitted to the devices 100, 1000 in response to a request transmitted from a device, rather than by the status service 150 pushing the status update to the device. If such a pull methodology is implemented, the status agent 310 can periodically poll the status service 150 for any new status updates. However, pushing the status updates to the communication device 100, 1000 does provide the advantage of having new delivered and read notifications transmitted to the device in a timelier manner, since the status service 150 need not wait for the device to request status updates.

Figure 4:
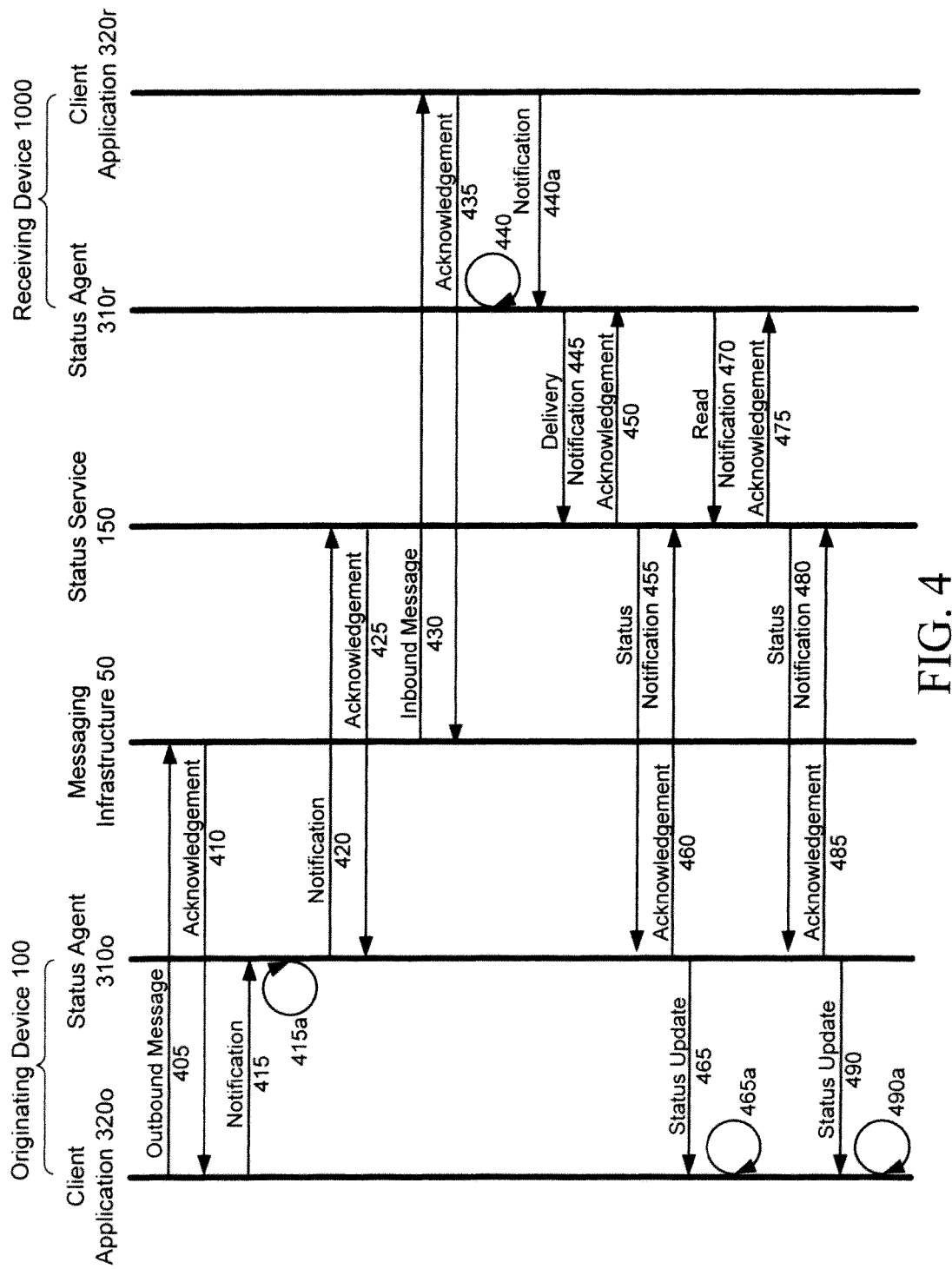
FIG. 4 is a communication diagram illustrating message and notification flow between various components of the network of FIG. 1.

An example of communication flow between the originating and receiving devices 100, 1000, a client application 320o, the status service 150, and messaging infrastructure 50 is illustrated in FIG. 4. The communication flow represented in FIG. 4 is simplified as the push service 70 is not illustrated, but the node representing the status service 150 in FIG. 4 may be considered to include the push service 70 used to transmit status notifications and receive acknowledgements. A client application 320o at the originating device 100, in this example a messaging application, prepares a message for transmission from the device 100. This message may comprise any one of the types of messages described above, such as email, instant messages, SMS, MMS, and the like. The message may be generated automatically by the client application based on user-input data and/or contextual or device information (for example, the client application may automatically generate messages indicating the current location of the device user based on a current location of the device 100, for transmission to a predefined recipient or recipients). The client application 320o assigns or generates a unique or quasi-unique message identifier (ID) or handle for the message. The message ID is advantageously sufficiently distinctive so as to permit the message to be uniquely identified at the status service 150, or by either of the status agents 310o, 310r at the originating and receiving devices. For example, if the message ID is not inherently sufficiently distinctive, it may be generated using a numeric string representing a current timestamp or concatenated with the current timestamp or an application identifier identifying the client application 320, 340, 350 generating the message. The message ID is incorporated into the message, for example in a message header or envelope. While the entire message ID may be typically included in the message, in some examples only a portion of the ID is included, although as noted above, a sufficiently distinct portion of the ID is used. The message may include some redundancy to ensure the integrity of the message ID. For example, a checksum computed from the message ID may be included in the message.

The message ID may include any suitable identifier generated and inserted or appended into the message in accordance with any applicable message standard used for that message format, such as the message-ID value defined in RFC 5322. For an SMS message, the message ID may be the message reference value, optionally concatenated or otherwise combined with additional data contained in the message. In a concatenated SMS message, the message ID can be the CSMS reference number contained in the user data header as defined in the SMS Point to Point Specification, 3GPP TS 23.040. In other examples, where the message reference values inherent in the applicable message protocol do not yield a sufficiently unique ID value, the message payload (i.e., the content of the message) or a concatenation of predetermined portions of the message, and even the entire message itself, may be used to define the message ID. For example, the message ID could be computed from a hash of the message header and content, or as a concatenation of the sender identity (e.g., the sender's email address or other identifier associated with the message) and another value within the message. If the data entity being transmitted from the device 100 is not a standards-defined message but in another format, such as data feed content or a file for use with a collaborative or groupware application 350, the message ID may be defined in a custom header or property accompanying the entity. However the message ID is defined or generated, the same message ID value is independently locatable within the received message at the receiving device 1000, or else is independently derivable from the message itself at the receiving device 1000.

The message is transmitted for delivery 405 to the recipient via the messaging structure 50 and messaging service, using the device's communication subsystem generally as known in the art. Typically, an acknowledgement 410 is provided to the device 100 from a component of the messaging infrastructure 50, such as a message server associated with the sending device 100, to confirm receipt of the message for relay to the recipient. This acknowledgement 410 thus does not indicate that the message was either received or read by the recipient. The message, as transmitted, includes the message ID as described above.

The status agent 310o on the originating device 100 is then notified of the outbound message. This notification may be implemented either by the client application 320o providing express notification of the outbound message 415 to the status agent 310o, or by the status agent 310o listening on the client application's outbound message queue for new messages, indicated at 415a. An express notification 415 comprises at least the message ID included in the message as transmitted or as derived from the message as transmitted, and optionally additional identifying information such as a message type identifier indicating the type of message sent (e.g., email, IM, SMS, etc.), a message timestamp, a client application identifier (which may include a callback identifier), or other metadata such as the recipient's address or other identifier. If the status agent 310o monitors the client application's outbound message queue, then the status agent 310o retrieves the message ID and any additional identifying information from the queue or from the application's corresponding data store. The status agent 310o stores the message ID and any other identifying information in the status data store 315. In FIG. 4, the notification 415 is shown without a paired acknowledgement or response transmitted from the status agent 310o to the client application 320o, but the status agent 310o may provide such a response to confirm receipt of the notification 415.

Notification of the outbound message 420, including the message ID, is then transmitted from the status agent 310o to the status service 150. Access to the status service 150 may be provided via a web API, with the status agent 310o constructing its notification message in the form of an HTTP (Hypertext Transfer Protocol) request message for transmission to the status service 150. A suitable acknowledgement response 425 can then be returned by the status service 150 to the status agent 310o. The content of the notification 420 need not include all information obtained by the status agent 310o regarding the outbound message 405. In a simple implementation, to minimize the amount of data transmitted by the originating device 100, the notification 420 only comprises sufficient data (such as the message ID) for the status service 150 to reconcile incoming status notifications with a particular outbound message. The status service 150 stores the received message ID and any additional identifying information for use in reconciling incoming status notifications with the outbound message in association with an identifier of the originating device 100 (e.g. an address for use in delivering push data), received with the notification 420, in its status data store 370.

It will be appreciated that the relative timing of events depicted in FIG. 4, such as the acknowledgements 410, 425 and notifications 415, 415a, 420, as well as events described below, may vary since the notification and status update procedures are executed asynchronously. For example, the notification 420 may be initiated even before the acknowledgement 410 confirming receipt of the outbound message at the messaging infrastructure 50 is received by the originating device 100. However, if the client application 320o does not await the acknowledgement 410 prior to initiating the notification to the status agent 415, it is possible that the status agent 310o will be invoked to monitor the status of a message that was not successfully sent. If no acknowledgement 410 is received within a predefined time, or if a delivery failure is reported by the messaging infrastructure 50 to the originating device 100, then the client application 320o, upon determining that transmission had failed, may provide the agent 310o with a notification that the monitoring of that particular message ID should be cancelled. In turn, the agent 310o can then notify the status service 150 of the cancellation so that the status service 150 can delete the record corresponding to that message ID from its store 370. The agent 310o may then also delete the record for that message ID from its own data store 315.

In the meantime, the message 430 is transmitted through the messaging infrastructure 50 as an inbound message to the receiving device 1000, where it is received in an incoming message queue for the client application 320r. An acknowledgement 435 may be provided by the device 1000, for example by the client application 320r, to the messaging infrastructure 50 (the acknowledgement 435 may instead be provided by another module on the device 1000).

The status agent 310r executing on the receiving device 1000 monitors the client application 320r's message store or an incoming message queue, or else awaits notification from the client application 320r that a new message has arrived. Upon determination that a new message has been received on behalf of the client application 320r, the status agent 310r extracts the message ID and any additional identifying information (as described above) as indicated at 440. Alternatively, the client application provides this information in a notification 440a. The status agent 310r then transmits a delivery notification 445 comprising the message ID, any additional identifying information, and a status indicator reflecting the incoming message's current status (in this case, the status indicator indicates that the message has been received by the receiving device 1000) to the status service 150. This notification 445 may be acknowledged by the status service 150 in a response 450. This delivery notification 445 can be provided using a similar method to that described for the status agent 310o providing the outbound message notification to the status service 150.

The status service 150, being in receipt of a message ID (and any additional identifying information) indicated as being delivered, queries its status data store 370 for a matching message ID. If a matching stored ID is found, the status service 150 then generates a status update message 455 for transmission (for example, via the push service 70 described above) to the originating device 100 identified in association with the stored ID. The status update message comprises the message ID, any further identifying information that may be required for the status agent 310o to correlate the status update message 455 with messages identified in the status agent 310o's data store, as well as an indicator of the new status (in this case, "delivered" or an appropriate code or flag indicating delivered status). The update message, again, may include a checksum or other redundancy value. The status update message or notification 455 is transmitted to the device 100, where it is provided to the status agent 310o. The status notification 455 may be provided in the form of an XML (eXtensible Markup Language) or JSON (JavaScript Object Notation) object, or in the form of an HTTP response. Again, an acknowledgement 460 may be provided by the device 100, from the status agent 310o or from another module on the device 100.

The status agent 310o then extracts the message ID and any additional identifying information received in the status notification 455 and identifies a corresponding message ID in its own store 315. If the message ID is found in the status data store 315, then the agent 310o provides a status update 465 (for example in the form of a callback) to the application 320o identified in association with the stored message ID. As mentioned above, the application 320o may instead monitor an incoming status queue to obtain updated status information, as indicated at 465a. The client application 320o may then update its own message store to reflect the new status information for the message (i.e., that it has been delivered to the recipient device 1000) and update any screens displaying that message or a message listing including that message to reflect the changed status.

In the meantime, new status information may be detected by the status agent 310r when the message as received by the receiving device 1000 is determined to have been read. A read notification 470 is then generated by the status agent 310r and delivered to the status service 150 (and optionally acknowledged 475), and in turn a new status notification 480 is delivered to the device 100 and the status agent 310o, indicating the new "read" status of the message. A further acknowledgement 485 may be provided by the device 100 to the status service 150. Finally, a further status update 490 is provided to the client application 320o, indicating that the message is read, or alternatively the client application 320o detects the newly received status 490a. The client application 320o can then update its message store and any screens displaying the message to reflect the changed status.

Thus, the status agents 310o, 310r implemented on the devices 100, 1000 and the status service 150 provide a system for tracking the delivered and read status of messages sent from the originating device 100 to the receiving device 1000, and for providing updated delivered and read status to the originating device 100, without requiring status messages to be transmitted over the same transport as the originally sent message. Because the status updates are transmitted asynchronously and advantageously using a push service, notifications are received promptly and are less likely to be subject to potential delay in the messaging infrastructure 50. Further, the system described herein is adaptable for use with multiple message formats, because the delivery of the delivered and read status notifications is message format- and transport-agnostic. A variety of message types can therefore be enhanced with the display of "delivered" and "read" notifications, enhancing user experience when interacting with recipients through electronic messaging. Further, this system may also enhance reply and forwarded messages generated at the recipient device 1000 from the original message. For example, if the recipient originates a response to the initial message M, this reply message may be assigned a distinct message ID from M by the reply-originating device (i.e., the receiving device 1000). Similarly, if the recipient forwards the received message M to another recipient, the forwarded message may be assigned a distinct message ID from M by the forwarding device (again, the receiving device 1000). The respective status agents of the participating communication devices 100, 1000 and the status service 150 will be able to track the status of the reply or forwarded message between the sender of the reply or forwarded message and the recipient of that message.

Further, by providing status agents 310o, 310r for handling the actual notification of the status service 150 and receipt of status updates, a variety of messaging applications may be easily adapted to incorporate delivered and read notifications without requiring the messaging applications themselves to be configured to receive and process the status notifications. Correlation of newly received status updates with messages previously transmitted from the originating device 100 is handled by the status agent 310o, and notification of the corresponding messaging application of the newly received status information is initiated by the agent 310o. On the receiving device 1000, the status agent 310r handles the transmission of status notifications to the status service 150 by monitoring incoming messages on behalf of the messaging applications, again avoiding the need for the messaging applications themselves to be configured to transmit delivery notifications to an external service.

Encryption or other security, although not expressly described, may be applied to the communications described herein. Encryption may be applied to any messages transmitted between the originating device 100 and the receiving device 1000 using techniques known in the art. The notifications passed between the originating device 100, status service 150, and receiving device 1000 may also be transmitted in encrypted format. However, if unencrypted, for added security, rather than passing the message IDs and other data in their raw or original format some or all of the data may be hashed or otherwise encoded by the devices 100, 1000 before it is transmitted to the status service 150. For example, the outbound message notifications and status notifications transmitted by the status agents 310o, 310r can contain hashed versions of the message IDs and other data, such as recipient addresses, contained therein. The status service 150 therefore stores the received hash values. When a status notification is received, the hash value in the status notification is matched against the hash values in the status service's store, and when a status update is sent to the status agent 310o of the originating device 100, the update message will contain hash values. Accordingly, the status agent 310o computes hashed values of the message IDs as well as the message IDs themselves, and matches the incoming status notifications to message IDs using the message ID hashes. In this manner, access at the status service 150 to potentially sensitive information such as recipient addresses is protected while still permitting the status service 150 to reconcile status updates with outbound messages.

Figure 5:
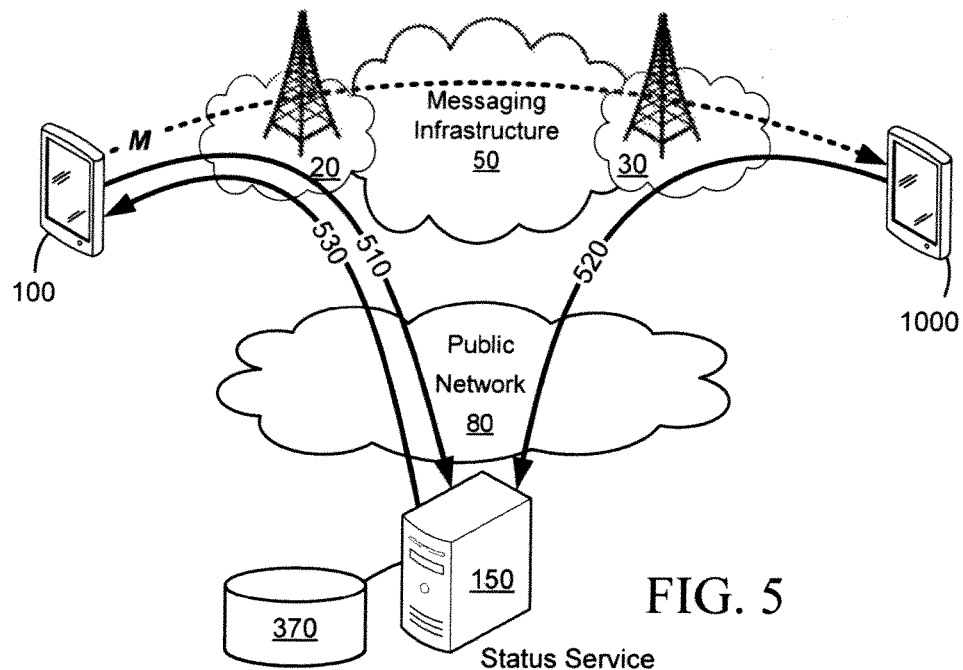
FIG. 5 is a schematic diagram illustrating a network topology for use in communicating status information between two mobile communication devices.

The foregoing system and methods may be implemented with a number of variants. FIG. 5 illustrates a network arrangement similar to that in FIG. 1, here omitting the push service 70 and select components of the status service 150 for clarity. In this example, the originating device 100 and the receiving device 1000 each communicate messages such as message M with the messaging infrastructure 50 via wireless networks 20, 30. The initial outgoing message notification 510 to the status service 150, the status notification 520 from the receiving device 1000 to the status service, and the status update 530 from the status service 150 to the originating device 100 take place in part over a public network 80 such as the Internet. This arrangement may be used with a number of message formats and protocols. The communication flow between the devices 100, 1000 can take place as generally described above.

Figure 6A:
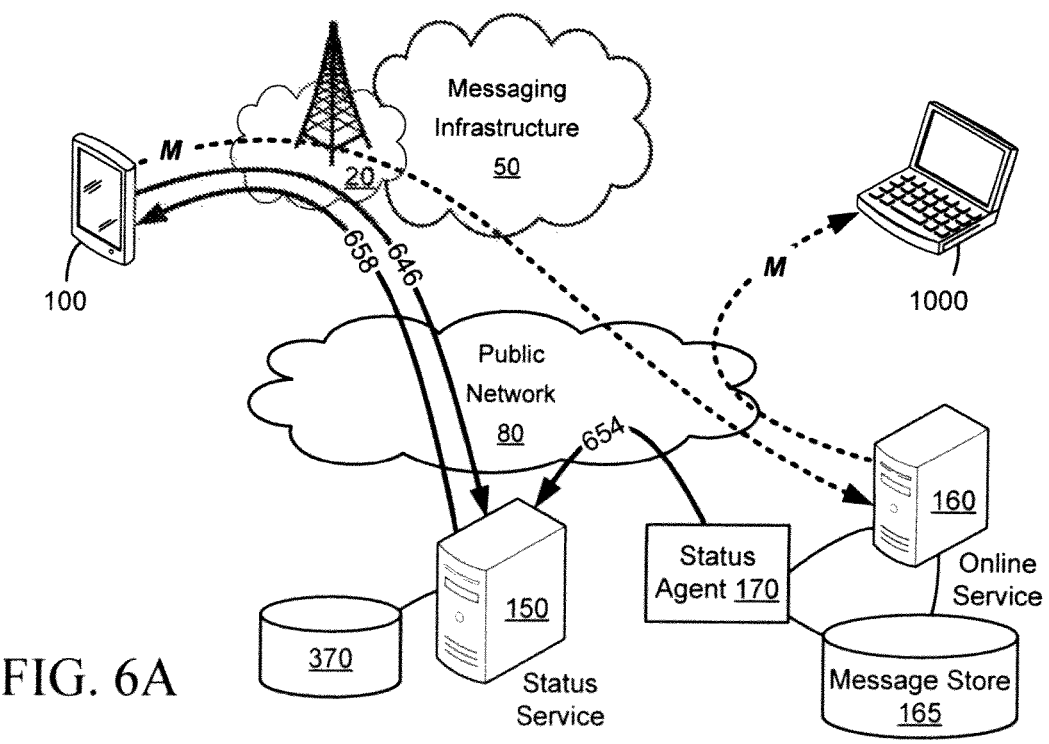
FIG. 6A is a schematic diagram illustrating a network topology for use in communicating status information between a mobile communication device and an online service.
Figure 6B:
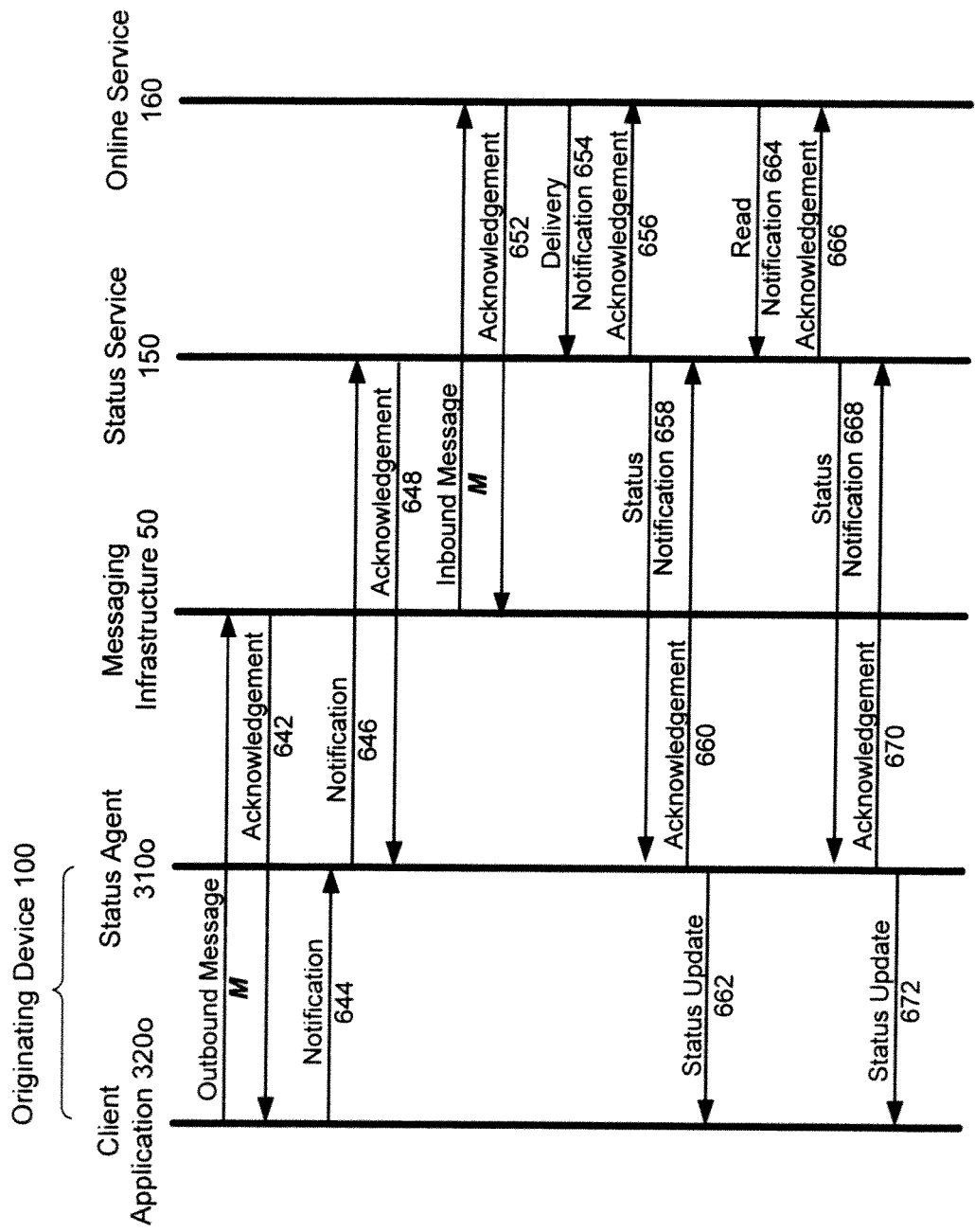
FIG. 6B is a communication diagram illustrating message and notification flow between various components of the network of FIG. 6A.

In FIG. 6A and accompanying communication diagram FIG. 6B, the receiving device 1000 is shown in communication with an online service 160. The online service can be accessed by the receiving device 1000 over the public network. The online service 160 may be a webmail or other Internet messaging service. Messaging may be the primary function of the service, or offered as an ancillary service, such as in a social web application. Users may subscribe or register for the online service. An account is maintained for each registered user, and any user-generated content (such as messages composed by the user for transmission from the online service) or messages addressed to the user's account are stored in association with that account in a message store 165. The message M is sent from the originating device 100 via the wireless network 20 and messaging infrastructure 50, generally as contemplated above (with an optional acknowledgement 642 received from the infrastructure 50), and thence via the public network 80 to the online service 160. At the originating device, the client application 320o provides a notification 644 to the status agent 310o comprising the message ID, as described above, and in turn the status agent 310o provides an outbound message notification 646 to the status service 150. An acknowledgement 648 is received in response.

In this example, the receiving device 1000 need not include a status agent. Rather, the online service 160 includes a status agent server or component 170. After the message M is received by the online service 160, the message is stored in the message store 165. The online service 150 can transmit an acknowledgement to the messaging infrastructure 50. The status agent component 170 monitors the message store 165 or an incoming message queue for new messages, and extracts the message ID of each new message. Alternatively the status agent component 170 receives a notification of the incoming message from a message handler component of the online service 160. The status agent component 170 then generates a delivered status notification 654 for transmission to the status service 150, as described above. The status service 150, as before, provides the status notification 658 to the status agent 810o of the originating device 100, and may receive an acknowledgement 660 from the device 100. The status agent 310o can then update 662 the client application 320o with the updated status as described above.

In the meantime, the online service provides the message to the receiving device 1000. If the online service is a webmail or other web messaging service, then the provision of the message M may be accomplished by transmitting a webpage or other code comprising the content of M to the receiving device 1000 in response to a request received from the receiving device 1000. Upon provision of the message M to the receiving device 1000, the message may be marked as read in the online service message store 165. The status agent component 170 detects the changed status of the message M and transmits a read status notification 664 including the message's ID to the status service 150. The status service returns an acknowledgement 666, and provides a status notification 668 to the status agent 310o comprising the message ID reflecting the changed status. The device 100 may acknowledge the notification 670, and finally the status agent 310o updates the status of the message for the client application 320o at 672, again as generally described above.

Figure 7A:
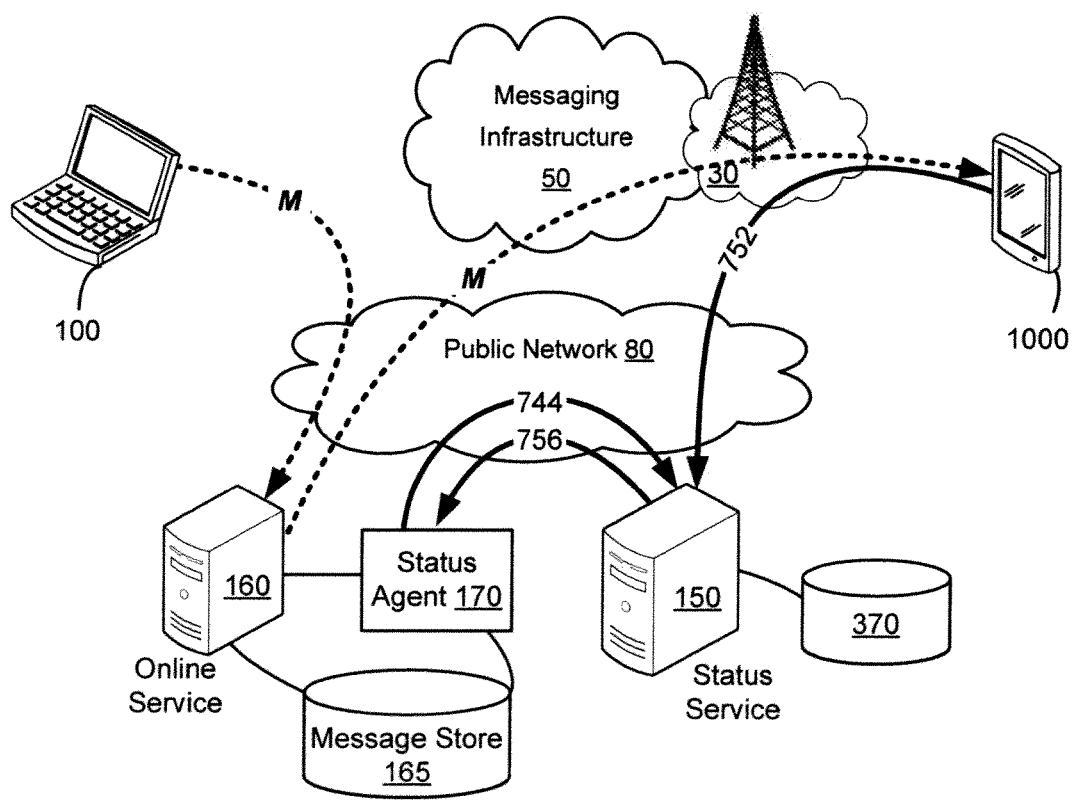
FIG. 7A is a schematic diagram illustrating a network topology for use in communicating status information between an online service and a mobile communication device.
Figure 7B:
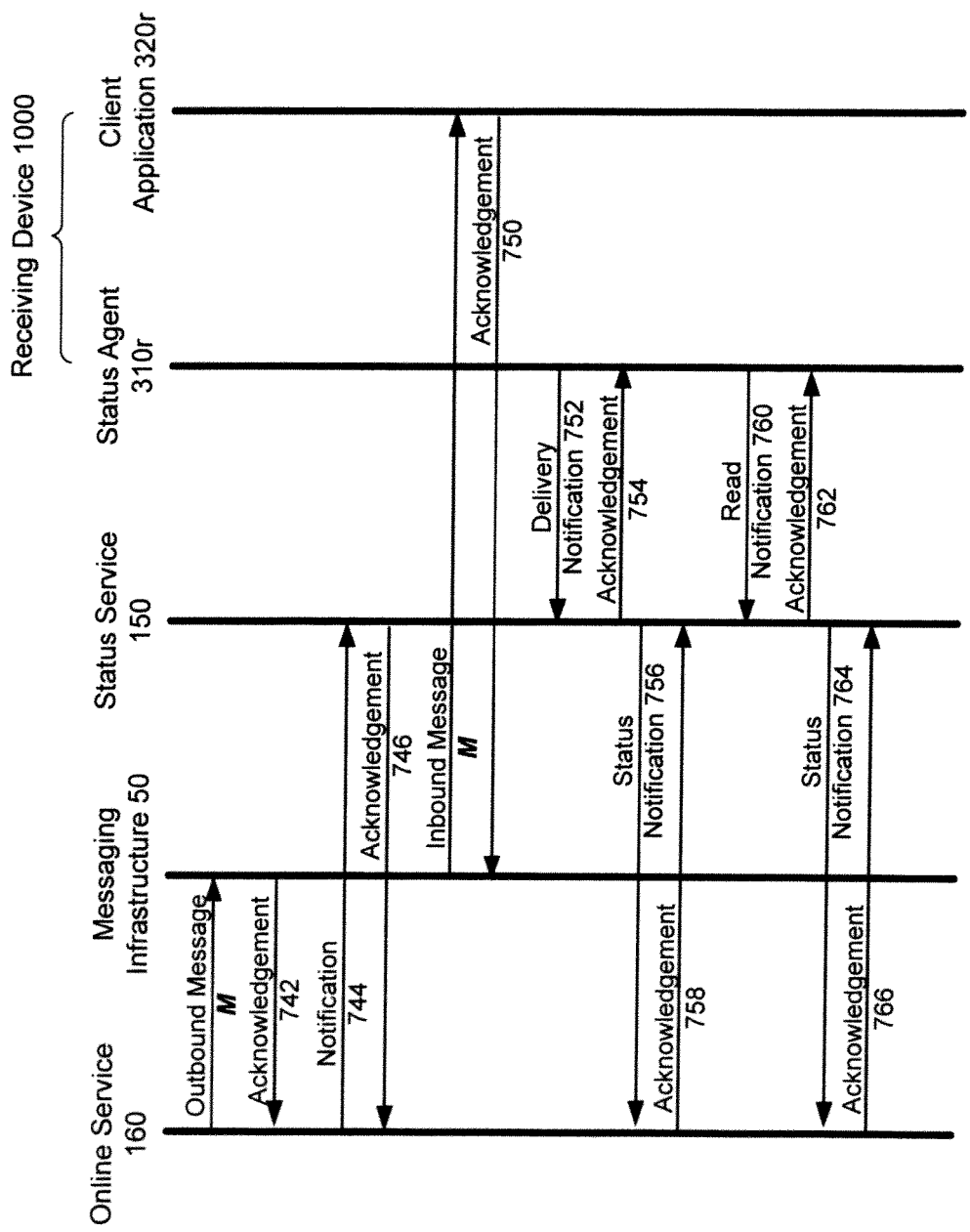
FIG. 7B is a communication diagram illustrating message and notification flow between various components of the network of FIG. 7A.

Turning to FIGS. 7A and 7B, the originating device 100 is now the device accessing the online service 160. The message M is sent from the originating device 100 to the online service 160 via the public network 80. From the online service 160, the message M is sent to the receiving device 1000 via a public network 80, messaging infrastructure 50, and a wireless network 30. The message may be acknowledged 742. The online service 160 also provides a notification 744 via its status agent component 170 to the status service 150, as described above, and in turn the status service 150 provides an acknowledgement 746. The message M is transmitted by the messaging infrastructure 50 to the receiving device 1000, for receipt on behalf of the client application 320r. An acknowledgement 350 may be transmitted from the device 1000 to the messaging infrastructure 50.

The status agent 310r on the receiving device 1000 then detects the received message, and provides a delivery status notification 752 identifying the message to the status service 150. An acknowledgement 754 is received in response. The status service 150 then provides a status update 756 to the online service's status agent component 170. The updated status, that of "delivered", may then be stored in the message store 165 in association with the message identified by the status update 756, and the status service 150 may receive an acknowledgement 758 in response.

When the message is read at the receiving device 1000, the receiving device's agent 310r detects the changed state and transmits a status update 760 comprising the message ID notifying the status service 150 of the new read status. The status service 150, after acknowledging 762 the notification, then transmits new status information 764 to the status agent component 170 of the online service 160. Again, an acknowledgement 766 may be transmitted from the online service 160 to the status service 150. The online service 160 stores the updated status in the message store 165. Thus, the next time the user of the online service 160 accesses his or her account to view a listing of messages sent from the online service from the user's account, updated delivered and read status will be available.

In the foregoing examples of FIGS. 6A to 7B, the status agent 170 of the online service 160 may thus report the status of every message M sent or received. Alternatively, the ability to track change status and report status notifications may be set at the user account level, so that status reporting may be enabled or disabled for an entire account by the user or an administrator.

Figures 8A, 8B:
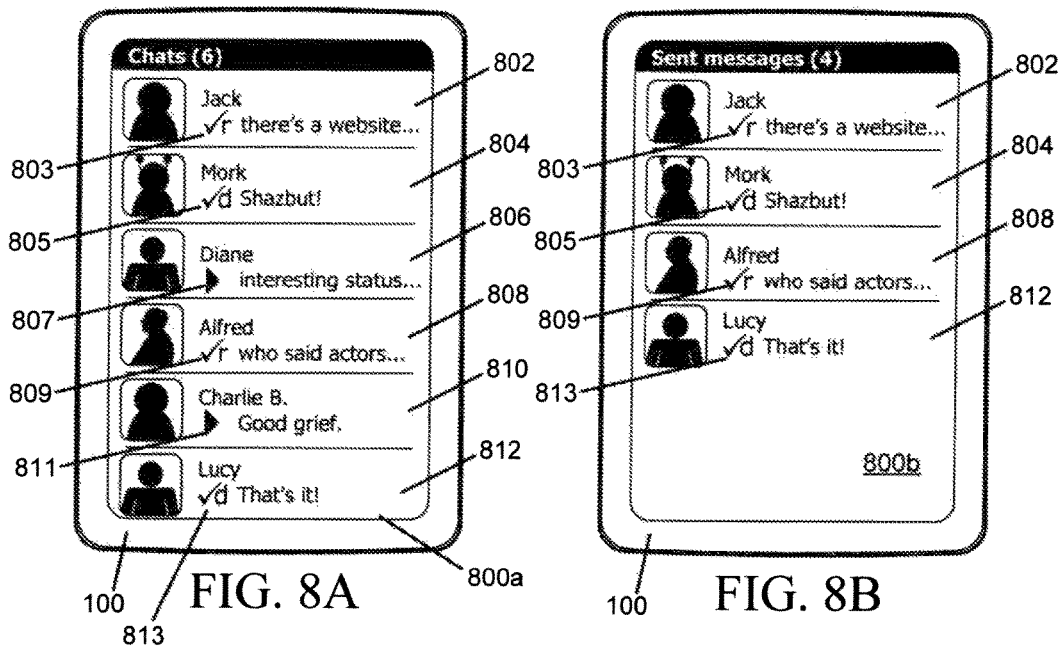
FIGS. 8A and 8B are further illustrations of graphical user interfaces presented on a communication device screen for a chat or instant messaging application.

As mentioned previously, the delivered and read status of sent messages may be displayed in graphical user interfaces on the originating or destination devices 100, 1000. Further examples are shown in FIGS. 8A to 8F. FIGS. 8A and 8B illustrate user interfaces 800a, 800b that may be displayed in a chat or instant messaging application. The user interface 800a of FIG. 8A displays a list of ongoing "chats" or instant message conversations 802, 804, 806, 808, 810, 812 that a user of the device 100 may have with individual recipients. Each listing includes a name and avatar of the other participant, as well as at least a portion of a last message transmitted from or received at the device 100. Each of the conversations is marked with an indicator or icon 803, 805, 807, 809, 811, 813, respectively. Conversations 806 and 810 are marked, respectively, with icons 807 and 811, which in this example denote that the most recent message in the conversation was received at the device 100 from the other participant. The remaining icons 803, 805, 809 and 811 denote that the most recent message in the conversation was transmitted from the device 100, and these icons indicate the status of that message as it was last known at the device 100. Icons 803 and 809 are "read" indicators, indicating that the last message sent from the device 100 was marked as read at the recipient's device, based on a status update notification received from the status service 150. Icons 805 and 811 are "delivered" indicators, indicating that the last message sent from the device 100 was received at the recipient's device, again based on a status update notification received from the status service 150.

The client messaging application may be configured to permit the user to filter or sort messages according to different criteria. In FIG. 8B, a further user interface 800b for the same application shown in FIG. 8A is illustrated, in which the contents of the message listing have been filtered to display sent items only. Thus, only conversations 802, 804, 808 and 812 are displayed with their corresponding icons 803, 805, 809 and 813. Thus, the user can easily identify which of his or her recipients has read the messages sent by the user, and can determine whether any other action needs to be taken to ensure that the recipient reads and responds to the message.

Figures 8C, 8D:
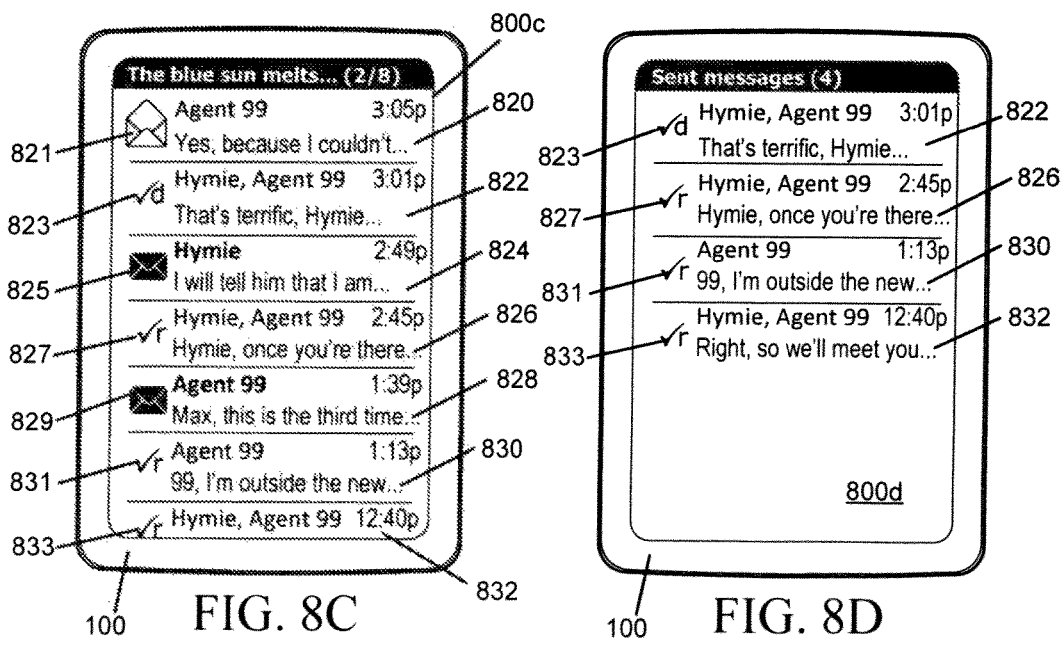
FIGS. 8C and 8D are illustrations of graphical user interfaces presented on a communication device screen for an email application.

FIG. 8C illustrates a user interface 800c for an email application containing a listing of both send and received messages 820, 822, 824, 826, 828, 830 and 832. Each of the messages is denoted with a corresponding icon 821, 823, 825, 827, 829, 831, 833, indicating a current state of the message. In this example, the icons 823, 827, 831, 833 denote messages that have been sent from the communication device 100, and also indicate the last known status of the email message as either delivered (email message 822) or read (email messages 826, 830, 832). Again, as shown in the user interface 800d of FIG. 8D, the listing can be filtered to display sent items only so that the user can determine at a glance which messages have been read by the recipient.

FIG. 8E illustrates another user interface 800e for a unified message box listing combining delivered and read status icons for multiple message formats such as instant messages (messages 842, 844, and 848) and email (messages 840, 846, and 850), each with a corresponding icon (843, 845, 849, 841, 847 and 851). Sent messages 842, 844, and 846 are denoted with delivered or read status icons 843, 845 and 847 respectively. The application presenting the unified message box user interface 800e may obtain the delivered and read status by querying the message stores storing the various messages at the device 100. The respective message stores would have been updated by the device's status agent 310 when status notifications for those messages were received.

In FIG. 8E, it may be noted that one sent message 848 is not denoted with either a delivered or read status icon. This may be the case where the recipient of the message received the message at a receiving device that is not configured with its own corresponding status agent 310, or at a receiving device that may be provided with a status agent 310, but where the receiving messaging application is not configured to interact with the status agent 310 to provide status updates to the status service 150. If no status is available for the sent message 848, the messaging application defining the user interface 800e may be configured to display a notification to the user of the device 100 that the recipient is not using an application or device supporting status agents. Thus, as shown in the user interface 800f of FIG. 8F, a notification 860 is displayed adjacent to the message 848. This notification 860 may comprise a user interface element that is actuatable (for example, by means of a tap or click using a user input interface such as a touchscreen, trackpad or button) to invoke an instruction on the device 100 to transmit a message to the recipient of the message 848 to download an appropriate application supporting the status agent 310, or to procure a communication device that is configured with a status agent 310.

FIG. 9 further illustrates the interaction between an application, such as the messaging application 320, with the status agent 310 on the originating device 100. At 900, transmission of a new message is initiated by the messaging application 820. At 910, the messaging application 320 notifies the status agent 310 of the outbound message, providing the message ID as described above, and optionally other information such as a timestamp, a client application identifier, recipient information, and other message metadata. The status agent 310 receives the outbound message notification at 920, and transmits an outbound message notification to the status service at 930. The outbound message notification may include only the message ID as described above, but it may also include one or more parts of the other information. At 940, the agent 310 receives a status update from the status service 150. The status agent 310 extracts the message ID from the update and looks up the message ID in its own store at 950. If necessary, additional information received in the status update (such as recipient information or other metadata) may be used in the lookup for the purpose of disambiguation, should the message ID not be unique in the agent's store. If no match of the message ID is found in the store, then the message ID may have expired or been deleted; the status update is therefore discarded at 960. If there is a match, then at 970 a status update comprising the message ID and the new status of the message (delivered or read) is provided to the messaging application 320. At 980, the status update is received by the messaging application 320, and at 990 the corresponding message store 325 is updated with the status of the message. If a currently displayed screen displays the message or a listing of the message, then at 990 the display is updated as well to reflect the newly received status of the message.

Figure 10:
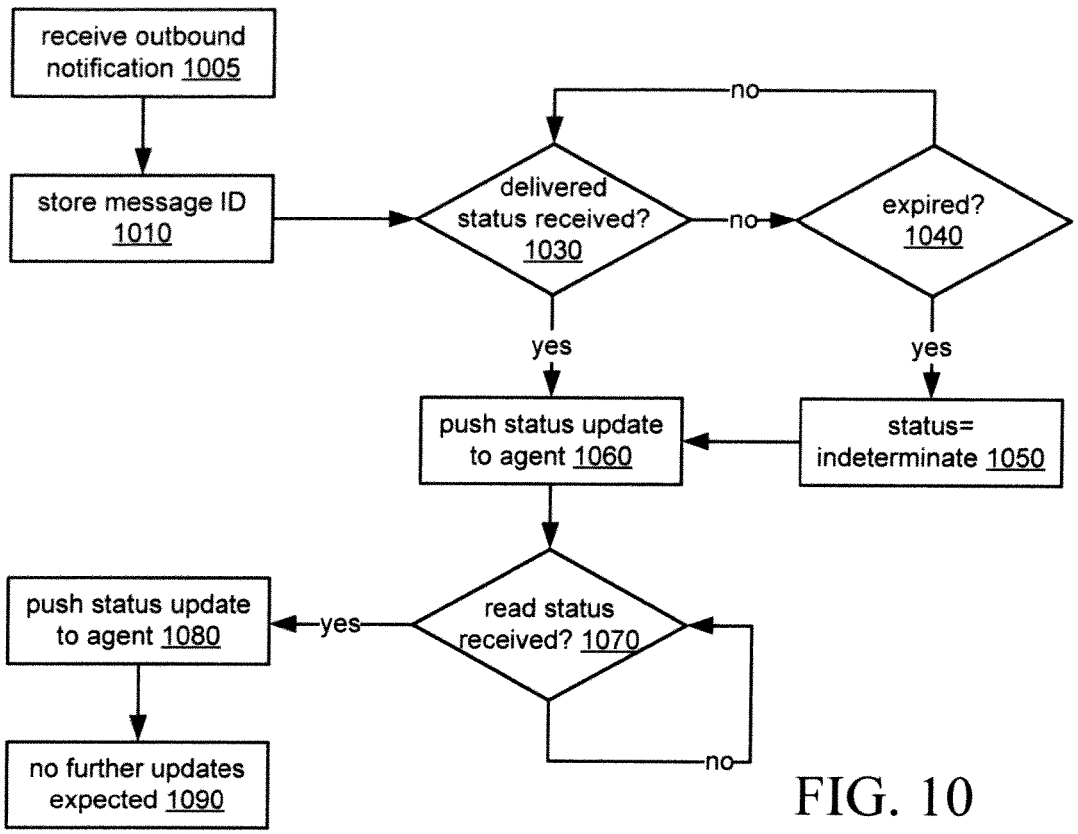
FIG. 10 is a flowchart illustrating a process for transmission and receipt of a message notification and related status information implemented at a status service.

FIG. 10 illustrates a process implemented at the status service 150. At 1005, an outbound message notification is received from a status agent 310. As described above, the notification includes at least a message ID. The message ID is stored at 1010. The status service 150 then waits for a delivery notification from a receiving device at 1030. Because the message may have been transmitted to a receiving device that does not implement or support a status agent, the status service 150 may be configured to assign a status of "indeterminate" or "unknown" if no delivered status notification is received within a predefine period of time. The period of time may be defined taking into account typical delays in relaying the message over the messaging infrastructure and the relative immediacy of the message (i.e., how quickly the message is conventionally expected to be received or read). For an email message, for example, the expiry time may be 3 days, while for an instant message the expiry time may be 12 hours. If it is determined at 1040 that no delivered status notification has been received by the expiry time, then the message status may be determined to be "indeterminate", and this status is pushed at 1060 to the status agent 310 on the originating device 100. Otherwise, when a delivered status notification is received, this delivered status update is pushed at 1060 to the status agent 310.

The status service 150 also waits for a read status notification at 1070. When the notification is received, this new read status is pushed to the device's status agent 310 at 1080, and no further updates are expected at 1090. Thus, after a further expiry period, the status service 150 may purge the record for that message ID from its store. The status service 150, however, may retain its records for a period of time for use in audits or diagnostic activities. Also, although not shown in FIG. 10, an expiry time may be associated with waiting for the read status notification at 1070. If no read notification is received within a given period of time, such as 1 week or one month, the record for that message ID may be automatically purged from the status service 150.

As another alternative, in some examples a message or other data entity may be defined with a expiration date, after which date the message is automatically deleted or from the originating device's message store and/or the recipient device's message store. This expiration date may be included in the outbound message notification received by the status service 150 at 1005, and stored together with the message ID at 1010. If the expiration date is reached prior to receipt of one or both of the delivered and read status notifications from the receiving device, then the record comprising the message ID is deleted at the status service 150 and no further status notifications are transmitted to the originating device 100.

Figure 11:
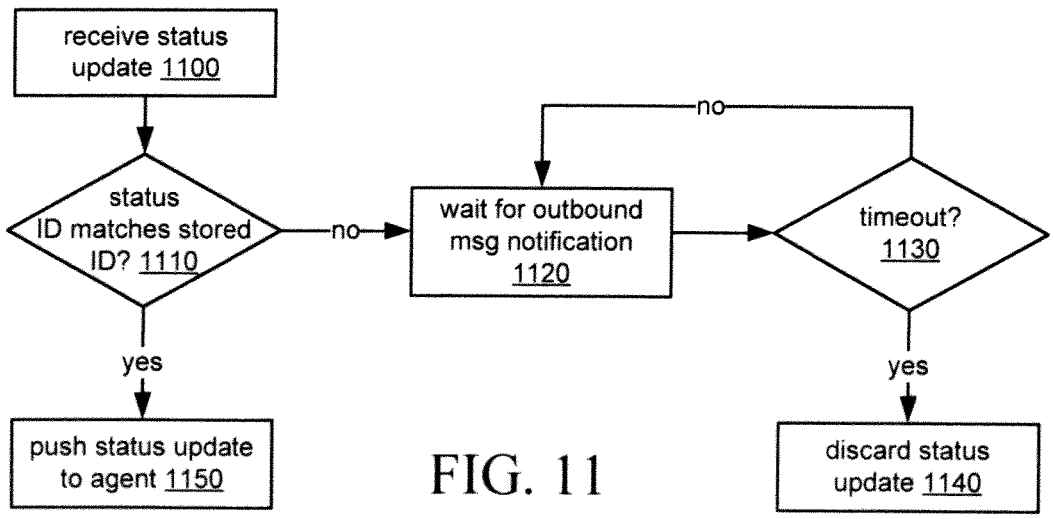
FIG. 11 is a flowchart illustrating a further process for managing status information at a status service.

Because outbound message and status notifications are transmitted asynchronously and network delays may occur, it is conceivable that in some circumstances status updates may be received by the status service 150 before the corresponding outbound message notification is received. Thus, as shown in FIG. 11, if the status update from a receiving device 1000 is initially received at the status service 150 at 1100, the status service 150 first determines at 1110 whether the message ID in the status update matches a stored message ID. If there is a match, the status service 150 then pushes the status update to the status agent 1150. If, however, there is no match, at 1120 the status service 150 stores the status update in association with the message ID and awaits receipt of an outbound message notification from the originating device 100. If a timeout occurs at 1130, then the status update is discarded at 1140. The timeout and deletion of the status update may be carried out as part of a period maintenance routine at the status service. For example, on a periodic basis (e.g. once per day), any records associated with expired timeout periods or past expiration dates are deleted.

A communication device 100, 1000 may have more than one messaging or data consuming application installed that makes use of the same types of messages. For example, email messages received at a communication device 100, 1000 associated with a given user account may be retrieved from a common message store by two different email applications. In that case, when the status agent 310 provides the status notification to the messaging application that initiated the outbound message notification, the messaging application can then update the message in the common message store. Thus, when the second messaging application accesses the same message, the current status will retrieved by the second messaging application. However, if the messaging applications do not update the message store, but rather maintain a separate store of status information for its messages, provision of the status update by the status agent 310 to the first messaging application will not result in the update being provided to the second messaging application.

Figure 12:
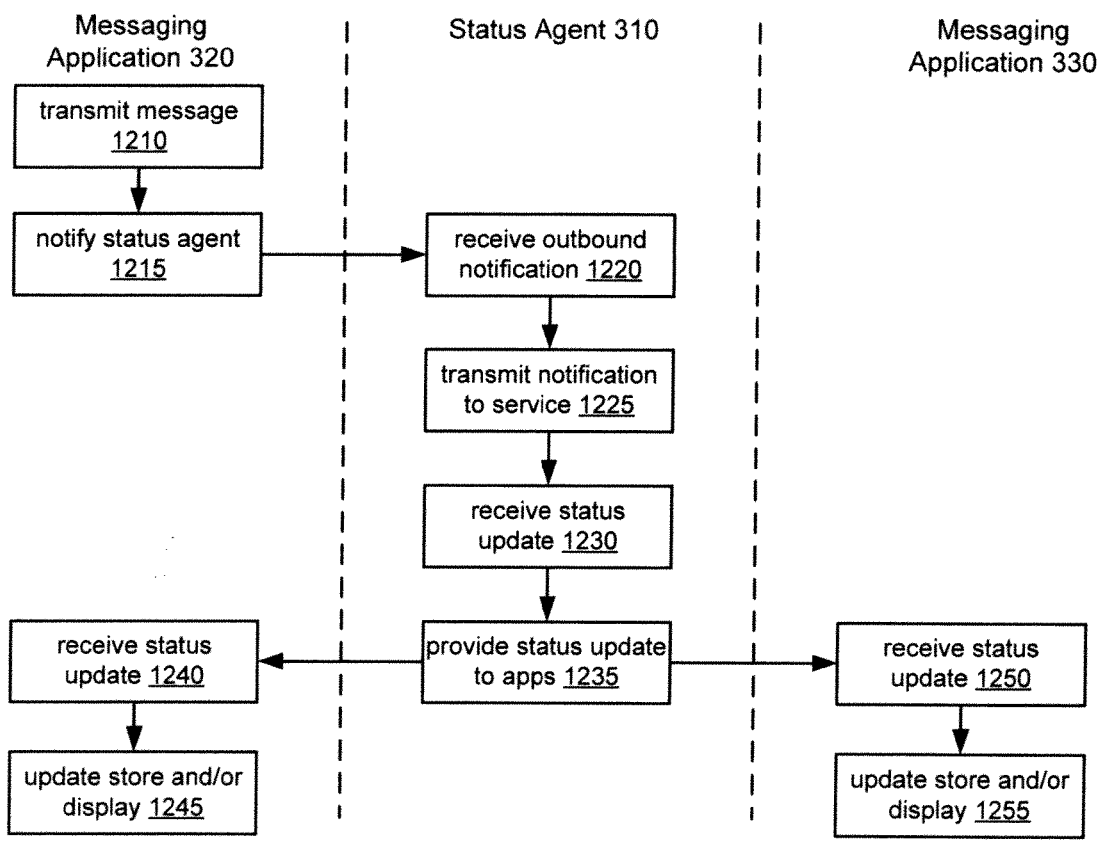
FIG. 12 is a further flowchart illustrating a process for transmission and receipt of status information for a message implemented at a communication device.

Thus, turning to FIG. 12, the status agent 310 may be configured to provide updates to multiple applications. Each application 320, 330, 340, 350 on the device that is configured to implement status notifications in conjunction with the status agent 310 may register with the status agent 310, each providing an interface or method to be called for passing status updates to the application. Then, a message is transmitted from a first messaging application 320 at 1210 and the status agent is notified at 1215. The notification to the status agent 310 includes not only the message ID, but also an indicator of the message type transmitted by the messaging application 320. For example, a flag or other code may be appended to the message ID or passed as a separate parameter to the status agent 310. The status agent 310 receives the outbound message notification from the first messaging application at 1220, and transmits a notification to the status service 150 at 1225. The notification transmitted to the service 150 need not include the message type indicator. As described above, the status agent 310 receives a status update from the status service 150 at 1230. The status agent 310 determines, upon looking up the message ID received in the status update, that the message ID is associated with a particular message type. A second messaging application 330 is also registered with the status agent 310 to receive status updates for that message type. Therefore, at 1235, rather than simply providing the status update to the first application 320, the status agent 310 provides the update to both the first and second applications 320, 330, each of which receives the update respectively at 1240, 1250, and updates its status store at 1245, 1255. If one of the applications is currently displaying the message for which a status update was received, then at 1245 or 1255 the application updates its display of the message to reflect the new status.

Figure 13:
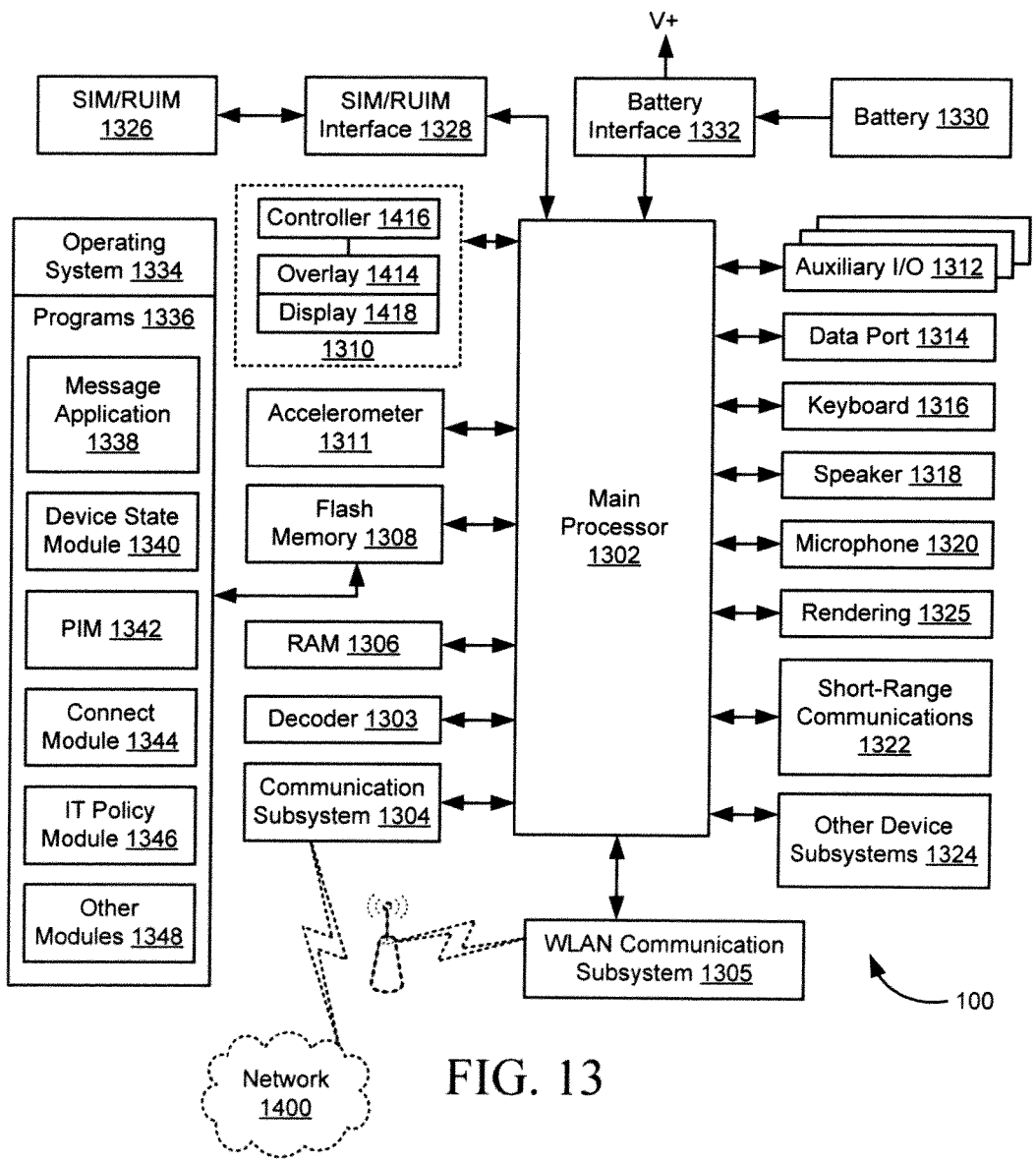
FIG. 13 is a block diagram of an example of a mobile device.

The embodiments described herein for implementation on a computing device may be implemented on a communication device such as that illustrated in FIG. 13. The communication device may communicate with other devices over a wireless communication system. The communication device 100 may be a mobile device with two-way communication and advanced data communication capabilities including the capability to communicate with other mobile devices or computer systems through a network of transceiver stations. The communication device 100 can also have voice communication capabilities. However, it will be appreciated by those skilled in the art that the foregoing embodiments do not require a dual-mode communication device; it is sufficient for the device 100 to be provisioned for data communication only via a fixed or wireless connection. Wireless connectivity may be provided by means of on-board communication hardware, such as the communication subsystems 1304, 1305 described below, or using accessories such as a wireless dongle or mobile hotspot device, not shown.

FIG. 13 is a block diagram of an example of a communication device 100. The communication device 100 includes a number of components such as a main processor 1302 that controls the overall operation of the communication device 100. Communication functions, including data and voice communications, are performed through a communication subsystem 1304. Data received by the communication device 100 can be decompressed and decrypted by decoder 1303, operating according to any suitable decompression techniques, and encryption/decryption techniques according to various standards, such as Data Encryption Standard (DES), Triple DES, or Advanced Encryption Standard (AES). Image data is typically compressed and decompressed in accordance with appropriate standards, such as JPEG, while video data is typically compressed and decompressed in accordance with appropriate standards, such as H.26x and MPEG-x series standards.

The communication subsystem 1304 receives messages from and sends messages to a wireless network 1400. In this example of the communication device 100, the communication subsystem 1304 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the examples described herein are intended to use any other suitable standards that are developed in the future. The wireless link connecting the communication subsystem 1304 with the wireless network 1400 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems.

The mobile device 100 may be provided with additional communication subsystems, such as the wireless LAN (WLAN) communication subsystem 1305 also shown in FIG. 13. The WLAN communication subsystem may operate in accordance with a known network protocol such as one or more of the 802.11™ family of standards developed by IEEE. The communication subsystem 1305 may be separate from, or integrated with, the communication subsystem 1304 or with the short-range communications module 1322. As noted above, voice communication capabilities and connectivity to voice-centric networks is not mandatory for the operation of the communication device 100 with the within examples. Thus, the wireless communication subsystem 1304 may be omitted. If so, optionally a dongle or other peripheral device (not shown) may be connected to the device 100 to provide the device 100 with access to the wireless network 200.

The main processor 1302 also interacts with additional subsystems such as a Random Access Memory (RAM) 1306, a flash memory 1308, a display 1310, other data and memory access interfaces such as an auxiliary input/output (I/O) subsystem 1312 or a data port 1314, a keyboard 1316, a speaker 1318, a microphone 1320, the short-range communications 1322 and other device subsystems 1324. The communication device may also be provided with an accelerometer 1311, which may be used to detect gravity- or motion-induced forces and their direction. Detection of such forces applied to the device 100 may be processed to determine a response of the device 100, such as an orientation of a graphical user interface displayed on the display assembly 1310 in response to a determination of the current orientation of the device 100.

In some examples, the user device 100 may comprise a touchscreen-based device, in which the display interface 1310 is a touchscreen interface that provides both a display for communicating information and presenting graphical user interfaces, as well as an input subsystem for detecting user input that may be converted to instructions for execution by the device 100. The touchscreen display interface 1310 may be the principal user interface provided on the device 100, although in some examples, additional buttons, variously shown in the figures or a trackpad, or other input means may be provided. In one example, a transmissive TFT LCD screen 1418 is overlaid with a clear touch sensor assembly 1414 that supports single and multi-touch actions such as tap, double-tap, tap and hold, tap and drag, scroll, press, flick, and pinch. The touchscreen display interface 1310 detects these single and multi-touch actions, for example through the generation of a signal or signals in response to a touch, which may then be processed by the processor 1302 or by an additional processor or processors in the device 100 to determine the location of the touch action, whether defined by horizontal and vertical screen position data or other position data. Touch location data may include an area of contact or a single point of contact, such as a point at or near a center of the area of contact. The touchscreen display interface 1310 may be provided with separate horizontal and vertical sensors or detectors to assist in identifying the location of a touch. A signal is provided to the controller 1416, shown in FIG. 13, in response to detection of a touch. The controller 1416 and/or the processor 1302 may detect a touch by any suitable contact member on the touch-sensitive display 1310.

Some of the subsystems of the communication device 100 perform communication-related functions, whereas other subsystems can provide "resident" or on-device functions. By way of example, the display 1310 and the keyboard 1316 can be used for both communication-related functions, such as entering a text message for transmission over the network 1400, and device-resident functions such as a calculator or task list.

A rendering circuit 1325 is included in the device 100. When a user specifies that a data file is to be viewed on the display 1310, the rendering circuit 1325 analyzes and processes the data file for visualization on the display 1310. Rendering data files originally optimized or prepared for visualization on large-screen displays on a portable electronic device display often requires additional processing prior to visualization on the small-screen portable electronic device displays. This additional processing may be accomplished by the rendering engine 1325. As will be appreciated by those of skill in the art, the rendering engine can be implemented in hardware, software, or a combination thereof, and can comprise a dedicated image processor and associated circuitry, or can be implemented within main processor 1302.

The communication device 100 can send and receive communication signals over the wireless network 1400 after required network registration or activation procedures have been completed. Network access is associated with a subscriber or user of the communication device 100. To identify a subscriber, the communication device 100 requires a SIM/RUIM/UICC card 1326 (i.e. Subscriber Identity Module, Removable User Identity Module, Universal Integrated Circuit Card, or the like) or another suitable identity module to be inserted into a SIM/RUIM/UICC interface 1328 in order to communicate with a network. The SIM/RUIM/UICC card 1326 is one type of a conventional "smart card" that can be used to identify a subscriber of the communication device 100 and to personalize the communication device 100, among other things. Without the SIM/RUIM/UICC card 1326, the communication device 100 is not fully operational for communication with the wireless network 1400. By inserting the SIM/RUIM/UICC card 1326 into the SIM/RUIM/UICC interface 1328, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM/UICC card 1326 includes a processor and memory for storing information. Once the SIM/RUIM/UICC card 1326 is inserted into the SIM/RUIM/UICC interface 1328, it is coupled to the main processor 1302. In order to identify the subscriber, the SIM/RUIM/UICC card 1326 can include some user parameters such as an International Mobile Subscriber Identity (IMSI). An advantage of using the SIM/RUIM/UICC card 1326 is that a subscriber is not necessarily bound by any single physical mobile device. The SIM/RUIM/UICC card 1326 can store additional subscriber information for a mobile device as well, including datebook (or calendar) information and recent call information. Alternatively, user identification information can also be programmed into the flash memory 1308.

The communication device 100 may be a battery-powered device including a battery interface 1332 for receiving one or more rechargeable batteries 1330. In at least some examples, the battery 1330 can be a smart battery with an embedded microprocessor. The battery interface 1332 is coupled to a regulator (not shown), which assists the battery 1330 in providing power V+ to the communication device 100. Although current technology makes use of a battery, future technologies such as micro fuel cells can provide the power to the communication device 100.

The communication device 100 also includes an operating system 1334 and software components 1336 to 1346 which are described in more detail below. The operating system 1334 and the software components 1336 to 1346 that are executed by the main processor 1302 are typically stored in a persistent store such as the flash memory 1308, which can alternatively be a read-only memory (ROM) or similar storage element (not shown). Those skilled in the art will appreciate that portions of the operating system 1334 and the software components 1336 to 1346, such as specific device applications, or parts thereof, can be temporarily loaded into a volatile store such as the RAM 1306. Select other modules 1348 may also be included, such as those described herein. Other software components can also be included, as is well known to those skilled in the art.

The subset of software applications 1336 that control basic device operations, including data and voice communication applications, will normally be installed on the communication device 100 during its manufacture. Other software applications include a message application 1338 that can be any suitable software program that allows a user of the communication device 100 to send and receive electronic messages. Various alternatives exist for the message application 1338 as is well known to those skilled in the art. Messages that have been sent or received by the user are typically stored in the flash memory 1308 of the communication device 100 or some other suitable storage element in the communication device 100. In at least some examples, some of the sent and received messages can be stored remotely from the device 100 such as in a data store of an associated host system with which the communication device 100 communicates.

The software applications can further include a device state module 1340, a Personal Information Manager (PIM) 1342, and other suitable modules (not shown). The device state module 1340 provides persistence, i.e. the device state module 1340 ensures that important device data is stored in persistent memory, such as the flash memory 1308, so that the data is not lost when the communication device 100 is turned off or loses power.

The PIM 1342 includes functionality for organizing and managing data items of interest to the user, such as, but not limited to, e-mail, contacts, calendar events, voice mails, appointments, and task items. A PIM application has the ability to send and receive data items via the wireless network 1400. PIM data items can be seamlessly integrated, synchronized, and updated via the wireless network 1400 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system. Some or all of the data items stored at the communication device 100 may be indexed for searching on the device 100 either through a corresponding application, such as the PIM 1342, or another suitable module. In addition, the items may be searchable using a unified search process implemented in the device operating system 1334. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The communication device 100 also includes a connect module 1344, and an information technology (IT) policy module 1346. The connect module 1344 implements the communication protocols that are required for the communication device 100 to communicate with the wireless infrastructure and any host system, such as an enterprise system with which the communication device 100 is authorized to interface.

The connect module 1344 includes a set of Application Programming Interfaces (APIs) that can be integrated with the communication device 100 to allow the communication device 100 to use any number of services associated with the enterprise system or with other systems accessible over the network 1400. The connect module 1344 allows the communication device 100 to establish an end-to-end secure, authenticated communication pipe with the host system. A subset of applications for which access is provided by the connect module 1344 can be used to pass IT policy commands from the host system to the communication device 100. This can be done in a wireless or wired manner. These instructions can then be passed to the IT policy module 1346 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 1400, the auxiliary I/O subsystem 1312, the data port 1314, the short-range communications subsystem 1322, or any other suitable device subsystem 1324. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 1314 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 1314 can be any suitable port that enables data communication between the communication device 100 and another computing device. The data port 1314 can be a serial or a parallel port. In some instances, the data port 1314 can be a USB port that includes data lines for data transfer and a supply line that can provide a charging current to charge the battery 1330 of the communication device 100.

The short-range communications subsystem 1322 provides for communication between the communication device 100 and different systems or devices, without the use of the wireless network 1400. For example, the subsystem 1322 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 1304 and input to the main processor 1302. The main processor 1302 will then process the received signal for output to the display 1310 or alternatively to the auxiliary I/O subsystem 1312. A subscriber can also compose data items, such as e-mail messages, for example, using the keyboard 1316 in conjunction with the display 1310 and possibly the auxiliary I/O subsystem 1312. The auxiliary subsystem 1312 can include devices such as: a touchscreen, mouse, track ball, infrared fingerprint detector, or a roller wheel with dynamic button pressing capability. The keyboard 1316 may be an alphanumeric keyboard and/or telephone-type keypad. However, other types of keyboards can also be used. A composed item can be transmitted over the wireless network 1400 through the communication subsystem 1304. It will be appreciated that if the display 1310 comprises a touchscreen, then the auxiliary subsystem 1312 may still comprise one or more of the devices identified above.

For voice communications, the overall operation of the communication device 100 is substantially similar, except that the received signals are output to the speaker 1318, and signals for transmission are generated by the microphone 1320. Alternative voice or audio I/O subsystems, such as a voice message recording subsystem, can also be implemented on the communication device 100. Although voice or audio signal output is accomplished primarily through the speaker 1318, the display 1310 can also be used to provide additional information such as the identity of a calling party, duration of a voice call, or other voice call related information.

The communication subsystem component 1304 may include a receiver, transmitter, and associated components such as one or more embedded or internal antenna elements, Local Oscillators (LOs), and a processing module such as a Digital Signal Processor (DSP) in communication with the transmitter and receiver. Signals received by an antenna through the wireless network 1400 are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP. In a similar manner, signals to be transmitted are processed, including modulation and encoding, by the DSP, then input to the transmitter for digital-to-analog (D/A) conversion, frequency up conversion, filtering, amplification and transmission over the wireless network 1400 via an antenna. The DSP not only processes communication signals, but also provides for receiver and transmitter control, including control of gains applied to communication signals in the receiver and the transmitter. When the communication device 100 is fully operational, the transmitter is typically keyed or turned on only when it is transmitting to the wireless network 1400 and is otherwise turned off to conserve resources. Similarly, the receiver is periodically turned off to conserve power until it is needed to receive signals or information (if at all) during designated time periods. Other communication subsystems, such as the WLAN communication subsystem 1305 or a WPAN communication subsystem, not shown, may be provided with similar components as those described above configured for communication over the appropriate frequencies and using the appropriate protocols. The particular design of the communication subsystem 1304, 1305, or other communication subsystem is dependent upon the communication network 1400 with which the communication device 100 is intended to operate. Thus, it should be understood that the foregoing description serves only as one example.

Figure 14:
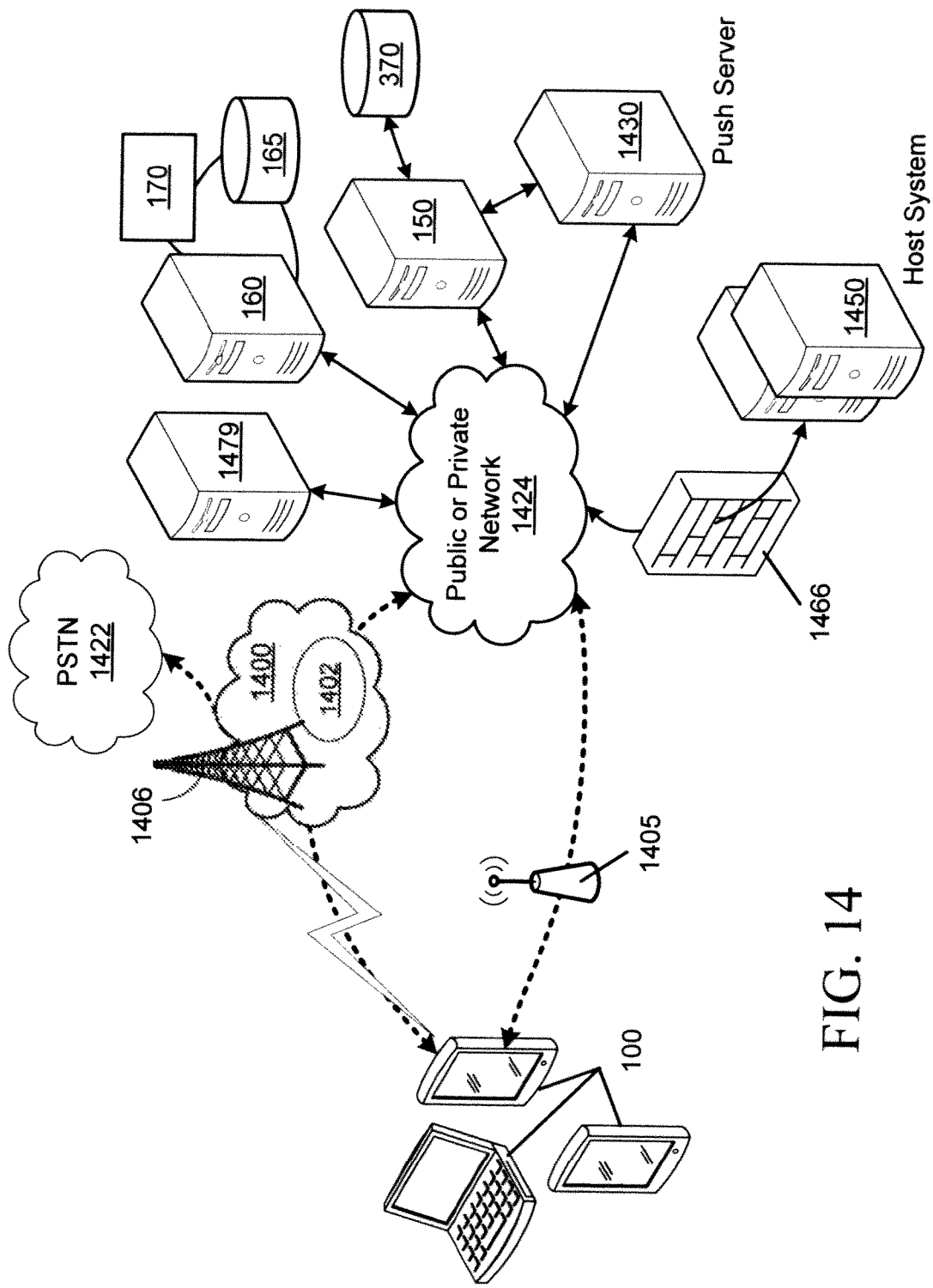
FIG. 14 is a schematic diagram of an example network topology for use with the mobile device of FIG. 13.

FIG. 14 illustrates a possible network topology for the communication device 100, including paths for data and voice traffic, and including a host or enterprise system 1450. The host or enterprise system 1450 will typically be a corporate enterprise or other local area network (LAN), but can also be a home office computer or some other private or quasi-private system, for example a subscription-based Internet service. Typically, a number of communication devices 100 can communicate wirelessly with the host or enterprise system 1450 through one or more nodes 1402 of the wireless network 1400.

The host or enterprise system 1450 comprises a number of network components, not shown, connected to each other by a network. Within the system 1450, for example, user (including administrator) computers may be situated on a LAN connection, and one or more of these desktop computers can be provided with connection facilities for loading information (e.g. PIM data, private symmetric encryption keys to facilitate secure communications) from the user computer to the communication device 100, and can be particularly useful for bulk information updates often performed in initializing the communication device 100 for use. To facilitate the operation of the communication device 100 and the wireless communication of messages and message-related data between the communication device 100 and components of the host system 1450, a number of wireless communication support components are provided within the system 1450 (not shown). In some implementations, the wireless communication support components can include one or more data stores, a message management server, a mobile data server, a web server, such as Hypertext Transfer Protocol (HTTP) server, a contact server, and a device manager module including an information technology policy server and editor. HTTP servers can also be located outside the host or enterprise system, as indicated by the HTTP server 1479 attached to the network 1424. Those skilled in the art know how to implement these various components. Other components can also be included as is well known to those skilled in the art.

The communication device 100's access to IP networks and to a public switched telephone network (PSTN), if applicable, can be provided through the wireless network 1400, which comprises one or more nodes 1402 configured for communication in accordance with a suitable mobile telephony standard. In turn, the wireless network 1400 provides the communication device 100 with connectivity to the Internet or other public wide area network 1424, and thence to the host or enterprise system 1450. At the same time, if the communication device 100 is a multiple-mode device, it may also communicate with the host or enterprise system 1450 over an enterprise LAN or WLAN, represented by the access point 1405. It will be appreciated by those skilled in the art, however, that access to the host system 1450 need not be limited to access via the enterprise network (whether wireless or not). Instead, the communication device 100 may access the host or enterprise system 1450 over another network, such as the wide area IP network 1424, via different access means, such as an access point located at the communication device user's home, or at a public or private Wi-Fi hotspot.

In this example, the communication device 100 communicates with the host or enterprise system 1450 through node 1402 of the wireless network 1400 and a shared network infrastructure 1424 such as a service provider network or the public Internet. Access to the host or enterprise system 1400 can be provided through one or more routers (not shown), and computing devices of the host or enterprise system 1450 can operate from behind a firewall or proxy server 1466. A proxy server provides a secure node and a wireless internet gateway for the host or enterprise system 1450. The proxy server intelligently routes data to the correct destination server within the host or enterprise system 1450.

For some wireless networks 1400 or LANs 1405, the communication device 100 may be registered or activated with the respective network. A process for identifying a subscriber to a cellular network using a SIM or other identifier card 1326 is described above. Other methods of registering or identifying the communication device 100 to various networks will be known to those of ordinary skill in the art. However, registration or activation may not be required for all wireless networks 1400, LANs or WLANs, as some networks may allow access without prior registration or activation. The communication device 100 may also be provisioned or configured to access one or more networks. Methods of provisioning services on a communication device 100 will be generally known to those skilled in the art, but as a non-limiting example, a request for registration may be sent from the communication device 100 to a registration server of a service (not shown). If the request is approved, the registration server may transmit to the communication device 100 a service book or similar data item containing data and instructions to enable the communication device 100 to provision the service. The service book, when received at the communication device 100, may be self-executing, and permits the user to enter account information relevant to the associated service. This information is then transmitted from the communication device 100 to a provisioning server of the service provider (not shown), which then creates a service account associated with the communication device 100. Provisioning may also be carried out in compliance with the OMA DM (Open Mobile Alliance Device Management) specification version 1.2 or its predecessor or successor versions, published by the Open Mobile Alliance Ltd.

One or more online services 160 are accessible over the network 1424 by the communication devices 100, by user devices connected to the host or enterprise system 1450 LAN, or by other user devices, not shown in FIG. 14. A push service, here represented by push server 1430, is accessible by the status service 150 (illustrated with data store 370; other components such as the communication interface 360, subscription manager 362, acknowledgement module 364, and push module 368 may be included within the push server 1430 or in additional components not illustrated). The push server 1430 may be integrated within the push service 150 or directly connected to the push service 150, bypassing the public network 1424. However, push services may also be provided as a third-party service to multiple services over the network 1424, including the online service 160. A push service may also be provided within the host or enterprise system 1450, although such a push service will generally deliver push content only to subscriber devices 100 registered with the enterprise.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A communication device, comprising:
   memory storing a first and second messaging application executing in the communication device, each of the first and second messaging applications having a corresponding first and second outbound message queue in the communication device;
   one or more microprocessors executing the first and second messaging applications, the one or more microprocessors being configured to:
     enable transmission of a first message associated with the first messaging application and a second message associated with the second messaging application for delivery to corresponding recipients;
     detect, by a status agent executing in the communication device separately from the first and second messaging applications, transmission of the first message and the second message from the communication device by the first and second messaging applications, the detecting comprising:
       monitoring the first and second outbound message queues;
       detecting a change to a first message status on the first outbound message queue corresponding to transmission of the first message;
       detecting a change to a second message status on the second outbound message queue corresponding to transmission of the second message;
     enable receipt of messages sent to the communication device;
     detect, by the status agent, receipt of a message sent to the communication device;
     detect, by the status agent, that the received message has been read at the communication device;
     enable transmission of, by the status agent for receipt by a status service,
       an outbound message notification for the first message after detecting the change to the first message status,
       an outbound message notification for the second message after detecting the change to the second message status,
       a received message notification after detecting receipt of the received message, and
       a read message notification after detecting that the received message has been read;
     enable receipt of, by the status agent from the status service, a delivery status update message for each of the first and second messages indicating delivery of each of said first and second messages, and a read status update message for each of the first and second messages indicating that each of said first and second messages was read;
     after the delivery status update message for the first message has been received, notify, by the status agent, the first messaging application that the first message has been delivered, and
display, on a display of the communication device, an indication that the first message has been delivered;
after the delivery status update message for the second message has been received,
notify, by the status agent, the second messaging application that the second message has been delivered, and
display, on the display of the communication device, an indication that the second message has been delivered;
after the read status update message for the first message has been received,
notify, by the status agent, the first messaging application that the first message has been read, and
display, on the display of the communication device, an indication that the first message has been read;
after the read status update message for the second message has been received,
notify, by the status agent, the second messaging application that the second message has been read, and
display, on the display of the communication device, an indication that the second message has been read.

2. The communication device of claim 1, further comprising a communication subsystem for wireless communication, wherein transmission of said first and second messages, outbound message notifications, received message notification, and read message notification, and receipt of said received messages, delivery status update messages, and read status update messages is carried out using said communication subsystem.

3. The communication device of claim 1, wherein the communication device is a wireless communication device.

4. The communication device of claim 1, wherein said communication device communicates with said status service over a wide area network.

5. The communication device of claim 1, wherein the first or second messaging application is an SMS messaging application.

6. The communication device of claim 5, wherein the first or second messaging application is an instant messaging application.

7. A method implemented on a communication device, comprising:
transmitting a first message associated with a first messaging application and a second message associated with a second messaging application from the communication device, each of the first and second messaging applications executing at the communication device and having a corresponding first and second outbound message queue at the communication device;
detecting, by a status agent executing at the communication device separately from the first and second messaging applications, transmission of the first message and the second message from the communication device by the first and second messaging applications, the detecting comprising:
monitoring the first and second outbound message queues;
detecting a change to a first message status on a first outbound message queue corresponding to transmission of the first message;
detecting a change to a second message status on the second outbound message queue corresponding to transmission of the second message;
detecting, by the status agent, receipt of a message sent to the communication device;
detecting, by the status agent, that the received message has been read at the communication device;
transmitting, using the status agent, for receipt by a status service,
an outbound message notification for the first message after detecting the change to the first message status,
an outbound message notification for the second message after detecting the change to the second message status,
a received message notification after detecting receipt of the received message, and
a read message notification after detecting that the received message has been read;
receiving from the status service, using the status agent, a delivery status update message for each of the first and second messages indicating delivery of each of said first and second messages, and a read status update message for each of the first and second messages indicating that each of said first and second messages was read;
after the delivery status update message for the first message has been received,
notifying, by the status agent, the first messaging application that the first message has been delivered, and
displaying, on a display of the communication device, an indication that the first message has been delivered;
after the delivery status update message for the second message has been received,
notifying, by the status agent, the second messaging application that the second message has been delivered, and
displaying, on the display of the communication device, an indication that the second message has been delivered;
after the read status update message for the first message has been received,
notifying, by the status agent, the first messaging application that the first message has been read, and
displaying, on the display of the communication device, an indication that the first message has been read;
after the read status update message for the second message has been received,
notifying, by the status agent, the second messaging application that the second message has been read, and
displaying, on the display of the communication device, an indication that the second message has been read.

8. The method of claim 7, wherein the communication device is a wireless communication device.

9. The method of claim 7, wherein the first or second messaging application is an SMS messaging application.

10. The method of claim 7, wherein the first or second messaging application is an instant messaging application.

11. The method of claim 7, wherein the first and second messages are transmitted via a messaging infrastructure separate from the status service.

12. Non-transitory computer-readable media storing code which, when executed by one or more processors of a communication device, cause the communication device to implement the method of:

transmitting a first message associated with a first messaging application and a second message associated with a second messaging application from the communication device, each of the first and second messaging applications executing at the communication device and having a corresponding first and second outbound message queue at the communication device;

detecting, by a status agent executing at the communication device separately from the first and second messaging applications, transmission of the first message and the second message from the communication device by the first and second messaging applications, the detecting comprising:
   monitoring the first and second outbound message queues;
   detecting a change to a first message status on a first outbound message queue corresponding to transmission of the first message;
   detecting a change to a second message status on the second outbound message queue corresponding to transmission of the second message;

detecting, by the status agent, receipt of a message sent to the communication device;

detecting, by the status agent, that the received message has been read at the communication device;

transmitting, using the status agent, for receipt by a status service,
   an outbound message notification for the first message after detecting the change to the first message status,
   an outbound message notification for the second message after detecting the change to the second message status,
   a received message notification after detecting receipt of the received message, and
   a read message notification after detecting that the received message has been read;

receiving from the status service, using the status agent, a delivery status update message for each of the first and second messages indicating delivery of each of said first and second messages, and a read status update message for each of the first and second messages indicating that each of said first and second messages was read;

after the delivery status update message for the first message has been received,
   notifying, by the status agent, the first messaging application that the first message has been delivered, and
   displaying, on a display of the communication device, an indication that the first message has been delivered;

after the delivery status update message for the second message has been received,
   notifying, by the status agent, the second messaging application that the second message has been delivered, and
   displaying, on the display of the communication device, an indication that the second message has been delivered;

after the read status update message for the first message has been received,
   notifying, by the status agent, the first messaging application that the first message has been read, and
   displaying, on the display of the communication device, an indication that the first message has been read;

after the read status update message for the second message has been received,
   notifying, by the status agent, the second messaging application that the second message has been read, and
   displaying, on the display of the communication device, an indication that the second message has been read.

13. The non-transitory computer-readable media storing code of claim 12, wherein the communication device is a wireless communication device.

14. The non-transitory computer-readable media storing code of claim 12, wherein the first or second messaging application is an SMS messaging application.

15. The non-transitory computer-readable media storing code of claim 12, wherein the first or second messaging application is an instant messaging application.

16. The non-transitory computer-readable media storing code of claim 12, wherein the first and second messages are transmitted via a messaging infrastructure separate from the status service.

* * * * *